US012769982B2

(12) United States Patent
Power et al.

(10) Patent No.: US 12,769,982 B2
(45) Date of Patent: Oct. 20, 2026

(54) SYSTEM AND METHOD FOR EVALUATING DEFENSIVE PERFORMANCE USING GRAPH CONVOLUTIONAL NETWORK

(71) Applicant: STATS LLC, Chicago, IL (US)

(72) Inventors: Paul David Power, Leeds (GB); Thomas Seidl, Munich (DE); Michael Stöckl, Munich (DE); Daniel Edison Marley, Chesterton, IN (US)

(73) Assignee: STATS LLC, Chicago, IL (US)

( * ) Notice: Subject to any disclaimer, the term of this patent is extended or adjusted under 35 U.S.C. 154(b) by 1005 days.

(21) Appl. No.: 17/649,970

(22) Filed: Feb. 4, 2022

(65) Prior Publication Data

US 2022/0253679 A1 Aug. 11, 2022

Related U.S. Application Data

(60) Provisional application No. 63/164,932, filed on Mar. 23, 2021, provisional application No. 63/146,039, filed on Feb. 5, 2021.

(51) Int. Cl.
*G06N 3/045* (2023.01)
*G06N 3/08* (2023.01)

(52) U.S. Cl.
CPC ............... *G06N 3/045* (2023.01); *G06N 3/08* (2013.01)

(58) Field of Classification Search
CPC ............ G06N 3/045; G06N 3/08; G06N 5/02; G06V 20/42
See application file for complete search history.

(56) References Cited

U.S. PATENT DOCUMENTS 6,616,529 B1 9/2003 Qian et al.
6,710,713 B1 3/2004 Russo
(Continued)

FOREIGN PATENT DOCUMENTS

CN 1386241 12/2002
CN 1708697 A 12/2005
(Continued)

OTHER PUBLICATIONS

Spearman et al., "Physics-Based Modelling of Pass Probabilities in Soccer", 2017 (Year: 2017).*
(Continued)

*Primary Examiner* — Jennifer N Welch
*Assistant Examiner* — Vijay M Balakrishnan
(74) *Attorney, Agent, or Firm* — Bookoff McAndrews, PLLC

(57) ABSTRACT

A computing system retrieves tracking data from a data store. The computing system converts the tracking data into a plurality of graph-based representations. The prediction engine learns to model defensive behavior based on the plurality of graph-based representations. The computing system generates a trained prediction engine based on the learnings. The computing system receives target tracking data for a target event. The target tracking data includes a plurality of target frames. The computing system converts the target tracking data to a plurality of target graph-based representations. The computing system models, via the trained graph neural network, defensive behavior of a team in the target event based on plurality of graph-based representations.

20 Claims, 19 Drawing Sheets

(56) References Cited

U.S. PATENT DOCUMENTS

| | | | |
|---|---|---|---|
| 6,751,343 | B1 | 6/2004 | Ferrell et al. |
| 9,342,785 | B2 | 5/2016 | Lucey et al. |
| 9,442,933 | B2 | 9/2016 | Tzoukermann |
| 10,201,752 | B2 | 2/2019 | Lucey et al. |
| 10,460,176 | B2 | 10/2019 | Chang et al. |
| 11,157,742 | B2 | 10/2021 | Zhang et al. |
| 11,182,806 | B1 | 11/2021 | Arfa et al. |
| 11,232,109 | B1 | 1/2022 | Knoll et al. |
| 2002/0165697 | A1 | 11/2002 | Min |
| 2004/0148275 | A1 | 7/2004 | Achlioptas |
| 2004/0148278 | A1 | 7/2004 | Milo et al. |
| 2005/0143198 | A1 | 6/2005 | Charge |
| 2006/0083304 | A1 | 4/2006 | Pan et al. |
| 2006/0149674 | A1 | 7/2006 | Cook et al. |
| 2006/0252476 | A1 | 11/2006 | Bahou |
| 2007/0293289 | A1 | 12/2007 | Loeb |
| 2008/0281444 | A1 | 11/2008 | Krieger et al. |
| 2009/0186679 | A1 | 7/2009 | Irvine et al. |
| 2009/0203447 | A2 | 8/2009 | Hansen et al. |
| 2010/0129780 | A1 | 5/2010 | Homsi et al. |
| 2010/0184495 | A1 | 7/2010 | Levy et al. |
| 2010/0184563 | A1 | 7/2010 | Molyneux et al. |
| 2010/0283630 | A1 | 11/2010 | Alonso |
| 2010/0298958 | A1 | 11/2010 | Connelly |
| 2011/0013087 | A1 | 1/2011 | House et al. |
| 2011/0169959 | A1 | 7/2011 | DeAngelis et al. |
| 2011/0173235 | A1 | 7/2011 | Aman et al. |
| 2011/0267461 | A1 | 11/2011 | Birenboim et al. |
| 2012/0162435 | A1 | 6/2012 | Elangovan et al. |
| 2012/0214602 | A1 | 8/2012 | Ahlstrom |
| 2013/0104870 | A1 | 5/2013 | Rizzo et al. |
| 2013/0110271 | A1 | 5/2013 | Fornell et al. |
| 2013/0225271 | A1 | 8/2013 | Amaitis |
| 2013/0238106 | A1 | 9/2013 | Ellis et al. |
| 2013/0267328 | A1 | 10/2013 | Heisler et al. |
| 2014/0142921 | A1 | 5/2014 | Gleadall et al. |
| 2014/0143183 | A1 | 5/2014 | Sigal et al. |
| 2014/0206479 | A1 | 7/2014 | Marty et al. |
| 2014/0236331 | A1 | 8/2014 | Lehmann et al. |
| 2014/0274245 | A1 | 9/2014 | Stickel |
| 2014/0302914 | A1 | 10/2014 | Weinstein et al. |
| 2014/0309000 | A1 | 10/2014 | Gustafson |
| 2014/0364976 | A1 | 12/2014 | Wohl et al. |
| 2015/0031845 | A1 | 1/2015 | McCauley et al. |
| 2015/0058730 | A1 | 2/2015 | Dubin et al. |
| 2015/0131845 | A1 | 5/2015 | Forouhar et al. |
| 2015/0142716 | A1 | 5/2015 | Lucey et al. |
| 2015/0148129 | A1 | 5/2015 | Austerlade et al. |
| 2015/0248917 | A1 | 9/2015 | Chang et al. |
| 2015/0258416 | A1 | 9/2015 | Ianni et al. |
| 2015/0360134 | A1 | 12/2015 | Rodriguez |
| 2016/0007054 | A1 | 1/2016 | Polumbus et al. |
| 2016/0096071 | A1 | 4/2016 | Ianni et al. |
| 2016/0182415 | A1 | 6/2016 | Ames et al. |
| 2016/0203279 | A1 | 7/2016 | Srinivas et al. |
| 2016/0220878 | A1 | 8/2016 | Devathi |
| 2016/0260015 | A1 | 9/2016 | Lucey et al. |
| 2016/0375365 | A1 | 12/2016 | Thompson et al. |
| 2017/0043260 | A1 | 2/2017 | Austerlade et al. |
| 2017/0061314 | A1 | 3/2017 | Schnurr et al. |
| 2017/0072321 | A1 | 3/2017 | Thompson et al. |
| 2017/0080336 | A1 | 3/2017 | Groset et al. |
| 2017/0109015 | A1 | 4/2017 | Krasadakis |
| 2017/0132821 | A1 | 5/2017 | Valliani et al. |
| 2017/0165570 | A1 | 6/2017 | Lucey et al. |
| 2017/0166557 | A1 | 6/2017 | Lucey et al. |
| 2017/0235848 | A1 | 8/2017 | Van Dusen et al. |
| 2017/0238055 | A1 | 8/2017 | Chang et al. |
| 2017/0246539 | A1 | 8/2017 | Schwartz et al. |
| 2017/0255830 | A1 | 9/2017 | Chen |
| 2017/0257653 | A1 | 9/2017 | Farre Guiu et al. |
| 2017/0259178 | A1 | 9/2017 | Aghdaie et al. |
| 2017/0291093 | A1 | 10/2017 | Janssen |
| 2017/0330029 | A1 | 11/2017 | Turcot et al. |
| 2018/0032858 | A1 | 2/2018 | Lucey et al. |
| 2018/0056124 | A1 | 3/2018 | Marty et al. |
| 2018/0084310 | A1 | 3/2018 | Katz et al. |
| 2018/0099201 | A1 | 4/2018 | Marty et al. |
| 2018/0137364 | A1 | 5/2018 | Forouhar et al. |
| 2018/0157974 | A1 | 6/2018 | Carr et al. |
| 2018/0158196 | A1 | 6/2018 | Marks |
| 2018/0204111 | A1 | 7/2018 | Zadeh et al. |
| 2018/0213033 | A1 | 7/2018 | Subbian |
| 2018/0218243 | A1 | 8/2018 | Felsen et al. |
| 2019/0087661 | A1 | 3/2019 | Lee et al. |
| 2019/0205652 | A1 | 7/2019 | Ray et al. |
| 2019/0221072 | A1 | 7/2019 | Litman |
| 2019/0224556 | A1 | 7/2019 | Ruiz et al. |
| 2019/0228290 | A1 | 7/2019 | Ruiz et al. |
| 2019/0228306 | A1 | 7/2019 | Power et al. |
| 2019/0251366 | A1 | 8/2019 | Zhong et al. |
| 2019/0294970 | A1 | 9/2019 | Fidler et al. |
| 2019/0374839 | A1 | 12/2019 | Wanke et al. |
| 2020/0004752 | A1 | 1/2020 | Majumdar et al. |
| 2020/0043287 | A1 | 2/2020 | Zhang et al. |
| 2020/0074181 | A1 | 3/2020 | Chang et al. |
| 2020/0170549 | A1 | 6/2020 | Baykaner et al. |
| 2020/0218902 | A1 | 7/2020 | Chang et al. |
| 2020/0230501 | A1 | 7/2020 | Schwartz et al. |
| 2020/0302181 | A1 | 9/2020 | Bhanu et al. |
| 2020/0336802 | A1 | 10/2020 | Russell et al. |
| 2020/0349611 | A1 | 11/2020 | Publicover et al. |
| 2020/0353311 | A1 | 11/2020 | Ganguly et al. |
| 2021/0056458 | A1 | 2/2021 | Savova et al. |
| 2021/0134124 | A1 | 5/2021 | Srinivasan |
| 2021/0142066 | A1 | 5/2021 | Jayaram et al. |
| 2021/0256265 | A1 | 8/2021 | Gurpinar-Morgan et al. |
| 2021/0272599 | A1 | 9/2021 | Patterson et al. |
| 2021/0304736 | A1 | 9/2021 | Kothari et al. |
| 2021/0383123 | A1 | 12/2021 | Hobbs et al. |
| 2021/0397846 | A1 | 12/2021 | Chang et al. |
| 2022/0038643 | A1 * | 2/2022 | López Felip .......... G06V 40/10 |
| 2022/0055689 | A1 | 2/2022 | Mandlekar et al. |
| 2022/0067983 | A1 | 3/2022 | Fidler et al. |
| 2022/0253679 | A1 | 8/2022 | Power et al. |
| 2022/0270004 | A1 | 8/2022 | Ruiz et al. |
| 2022/0284311 | A1 | 9/2022 | Haynes et al. |

FOREIGN PATENT DOCUMENTS

| | | | |
|---|---|---|---|
| CN | 102819749 | A | 12/2012 |
| CN | 105833502 | | 8/2016 |
| CN | 110826539 | A | 2/2020 |
| KR | 10-0986647 | | 10/2010 |
| KR | 102211135 | B1 | 2/2021 |
| WO | 0122270 | A2 | 3/2001 |
| WO | 2013166456 | A2 | 11/2013 |
| WO | 2014/008134 | | 1/2014 |
| WO | 2015/076682 | | 5/2015 |
| WO | 2017/031356 | | 2/2017 |
| WO | 2017/161167 | | 9/2017 |
| WO | 2019152702 | A1 | 8/2019 |
| WO | 2020/010040 | | 1/2020 |

OTHER PUBLICATIONS

Bagautdinov et al., “Social Scene Understanding: End-to-End Multi-Person Action Localization and Collective Activity Recognition”, 2017 (Year: 2017).*

Qi et al., “stagNet: An Attentive Semantic RNN for Group Activity and Individual Action Recognition”, 2020 (Year: 2020).*

Oprea et al., “A Review on Deep Learning Techniques for Video Prediction”, 2020 (Year: 2020).*

Chatzigiorgaki et al., “Real-time Keyframe Extraction Towards Video Content Identification”, 2009, IEEE, 6 pages (Year: 2009).*

Lucey et al., “Assessing Team Strategy using Spatiotemporal Data”, 2013, KDD ’13: Proceedings of the 19th ACM SIGKDD international conference on Knowledge discovery and data mining, 9 pages (Year: 2013).*

Fernandez et al., “SoccerMap: A Deep Learning Architecture for Visually-Interpretable Analysis in Soccer”, Oct. 20, 2020, arXiv: 2010.10202v1, 16 pages (Year: 2020).*

(56) References Cited

OTHER PUBLICATIONS

Rowlinson, Andrew, "mplsoccer.pitch module", available Jun. 1, 2020 at Wayback Machine, https://mplsoccer.readthedocs.io/en/latest/mplsoccer.pitch.html, 14 pages (pp. 1-14 of 32) (Year: 2020).*
Rowlinson, Andrew, "Basics", available Jun. 2, 2020 at Wayback Machine, https://mplsoccer.readthedocs.io/en/latest/gallery/pitch_setup/plot_pitches.html, 18 pages (pp. 15-32 of 32) (Year: 2020).*
Srinivas, et al., "A taxonomy of deep convolutional neural nets for computer vision," Frontiers in Robotics and AI 2, Jan. 11, 2016, 13 pages.
Dertat, et al., "Applied deep learning—part 4: Convolutional neural networks," Towards Data Science 26, https://towardsdatascience.com/applied-deep-learning-part-4-convolutional-neural-networks-584bc134c1e2, Nov. 8, 2017, 26 pages.
Edge AI and Vision Alliance, "Using Cconvolutional Neural Networks fo Image Recognition," https://www.edge-ai-vision.com/2015/11/using-convolutional-neural-networks-for-image-recognition/, Nov. 12, 2015, 20 pages.
Machine Learning Notebook, "Convolutional Neural Networks—Basics," https://mlnotebook.github.io/post/CNN1/, Apr. 7, 2017, 13 pages.
Knauf, et al., "Spatio-temporal convolution kernels," Machine learning 102.2, Jul. 2015, 28 pages.
Chandler, et al., "An exploratory study of minor league baseball statistics," Journal of Quantitative Analysis in Sports 8.4, 2012, 37 pages.
Perricone, et al., "Predicting Results for Professional Basketball Using NBA API Data," 2016, 6 pages.
Kinoshita, et al., "Deep mixture density network for statistical model-based feature enhancement," 2017 IEEE International Conference on Acoustics, Speech and Signal Processing (ICASSP), Mar. 2017, pp. 251-255.
Wang, et al., "Classifying NBA offensive plays using neural networks," Proceedings of MIT Sloan Sports Analytics Conference, vol. 4, 2016, 9 pages.
Zhao, "Research and Application of Online Learning of Formation Strategy Based on Neural Network Information Technology Collection of China Masters' Dissertations Full Text Database," No. 2, 2014, pp. 38-40.
Liang, et al., "Dual motion GAN for future-flow embedded video prediction," proceedings of the IEEE international conference on computer vision, 2017, 9 pages.
Mehrotra, "Elements of artifical neural networks," MIT Press, 1997.
Arabzad, et al., "Football match results prediction using artificial neural networks; the case of Iran Pro League," Journal of Applied Research on Industrial Engineering 1.3, Oct. 9, 2014, pp. 159-179.
PCT International Application No. PCT/US19/14614, International Search Report and Written Opinion of the International Searching Authority, dated Apr. 16, 2019, 9 pages.
PCT International Application No. PCT/US19/14608, International Search Report and Written Opinion of the International Searching Authority, dated Apr. 15, 2019, 12 pages.
PCT International Application No. PCT/US21/16583, International Search Report and Written Opinion of the International Searching Authority, dated Apr. 23, 2021, 11 pages.
Acuna, "Unsupervised modeling of the movement of basketball players using a deep generative model," 31st Conference on Neural Information Processing Systems, 2017, 11 pages.
Felsen, et al., "Where will they go? predicting fine-grained adversarial multi-agent motion using conditional variational autoencoders," Proceedings of the European conference on computer vision (ECCV), 2018, pp. 761-776.
Nakashima, et al., "Off-line learning of soccer formations from game logs," 2010 World Automation Congress, 2010, 6 pages.
Janetzko, et al., "Feature-driven visual analytics of soccer data," 2014 IEEE conference on visual analytics science and technology (VAST), Nov. 2014, pp. 13-22.
Wagenaar, "Predicting Goal-Scoring Opportunities in Soccer by Using Deep Convolutional Neural Networks," Department of Artificial Intelligence, University of Groningen, Nov. 16, 2016, 65 pages.
Abreu, et al., "Improving a simulated soccer team's performance through a Memory-Based Collaborative Filtering approach," Applied Soft Computing 23, 2014, pp. 180-193.
McCabe, et al., "Artificial intelligence in sports prediction," Fifth International Conference on Information Technology: New Generations, IEEE Computer Society, Apr. 9, 2008, 4 pages.
Abdullah, et al., "Intelligent prediction of soccer technical skill on youth soccer player's relative performance using multivariate analysis and artificial neural network techniques," International Journal on Advanced Science, Engineering and Information Technology 6.5, Dec. 2016, pp. 668-674.
Preferred Networks, Inc., "Football Analytics using Deep Learning," YouTube, https://www.youtube.com/watch?v=hs_v3dv6OUI, Jul. 25, 2019, 3 pages.
Power, et al., "Not all passes are created equal: Objectively measuring the risk and reward of passes in soccer from tracking data," Proceedings of the 23rd ACM SIGKDD international conference on knowledge discovery and data mining, Aug. 2017, pp. 1605-1613.
Cervone, et al., "A multiresolution stochastic process model for predicting basketball possession outcomes," Journal of the American Statistical Association 111.514, 2016, pp. 585-599.
Ruiz, et al., "The Leicester City Fairytale? Utilizing New Soccer Analytics Tools to Compare Performance in the 15/16 & 16/17 EPL Seasons," Proceedings of the 23rd ACM SIGKDD International Conference on Knowledge Discovery and Data Mining, 2017, 13 pages.
Gyarmati, et al., "Searching for a unique style in soccer," arXiv preprint arXiv:1409.0308, 2014, 4 pages.
PCT International Application No. PCT/US21/53117, International Search Report and Written Opinion of the International Searching Authority, dated Jan. 14, 2022, 9 pages.
Trainor, "Goalkeepers: How repeatable are shot saving performances?", Statsbomb, https://statsbomb.com/2014/10/goalkeepers-how-repeatable-are-shot-saving-performances/, Oct. 21, 2014.
Newton, "How Youtub Perfected The Feed", The Verge, https://www.theverge.com/2017/8/30/16222850/youtube-google-brain-algorithm-video-recommendation-personalized-feed, Aug. 30, 2017.
Covington, et al., "Deep neural networks for youtube recommendations", Proceedings of the 10th ACM conference on recommender systems, pp. 191-198, Sep. 2016.
Cheng, et al., "Wide & deep learning for recommender systems", Proceedings of the 1st workshop on deep learning for recommender systems, Sep. 2016.
Alcorn, "(batter|pitcher) 2vec: statistic-free talent modeling with neural player embeddings", MIT Sloan Sports Analytics Conference, 2018.
Wei, et al., "The thin edge of the wedge: Accurately predicting shot outcomes in tennis using style and context priors", Proceedings of the 10th Annual MIT Sloan Sport Anal Conference, Mar. 2016.
Seidl, et al., "Bhostgusters: Realtime interactive play sketching with synthesized NBA defenses", Proceeding of the 12th MIT Sloan Sports Analytics Conference, 2018.
Maaten, et al., "Visualizing data using t-SNE", Journal of machine learning research 9/08, pp. 2579-2605, Nov. 2008.
Felsen, et al., "Body shots: Analyzing shooting styles in the NBA using body pose", MIT Sloan, Sports Analytics Conference, Mar. 2017.
Sha, et al., "Fine-Grained Retrieval of Sports Plays using Tree-Based Alignment of Trajectories", arXiv preprint arXiv:1710.02255, Oct. 6, 2017, 10 pages.
Lee, et al., "Desire: Distant Future Prediction in Dynamic Scenes with Interacting Agents", Proceedings of the IEEE Conference on Computer Vision and Pattern Recognition, 2017, 10 pages.
Alahi, et al., "Social LSTM: Human Trajectory Prediction in Crowded Spaces", Proceedings of the IEEE conference on computer vision and pattern recognition, 2016, 11 pages.
Jain, et al., "Recurrent Neural Networks for Driver Activity Anticipation via Sensory-Fusion Architecture", IEEE International Conference on Robotics and Automation (ICRA), 2016, 8 pages.

(56) References Cited

OTHER PUBLICATIONS

Akhter, et al., "Bilinear Spatiotemporal Basis Models", ACM Transactions on Graphics, vol. 30, No. 2, Article 17, Apr. 2012, 12 pages.
Lucey, et al., "Representing and Discovering Adversarial Team Behaviors using Player Roles", Proceedings of the IEEE Conference on Computer Vision and Pattern Recognition, 2013, 8 pages.
Insafutdinov, et al., "ArtTrack: Articulated Multi-Person Tracking in the Wild", Proceedings of the IEEE Conference on Computer Vision and Pattern Recognition, 2017, 9 pages.
Le, et al., "Coordinated Multi-Agent Imitation Learning", Proceedings of the 34th International Conference on Machine Learning—vol. 70. JMLR. org, 2017, 13 pages.
Yamaguchi, et al., "Who are you with and Where are you going?", CVPR 2011. IEEE, 2011, 8 pages.
Butt, et al., "Multi-target Tracking by Lagrangian Relaxation to Min-Cost Network Flow", Proceedings of the IEEE Conference on Computer Vision and Pattern Recognition, 2013, 8 pages.
Wang, et al., "Learning Optimal Parameters For Multi-target Tracking", International journal of computer vision 122.3 , 2017, 13 pages.
Maksai, et al., "What Players do with the Ball: A Physically Constrained Interaction Modeling", Proceedings of the IEEE Conference on Computer Vision and Pattern Recognition, 2016, 10 pages.
Kim, et al., "Motion Fields to Predict Play Evolution in Dynamic Sport Scenes", IEEE Computer Society Conference on Computer Vision and Pattern Recognition, 2010, 8 pages.
Chen, et al., "Learning Online Smooth Predictors for Realtime Camera Planning using Recurrent Decision Trees", Proceedings of the IEEE Conference on Computer Vision and Pattern Recognition, 2016, 14 pages.
Zheng, et al., "Generating Long-term Trajectories Using Deep Hierarchical Networks", Advances in Neural Information Processing Systems, 2016, 9 pages.
Felsen, et al., "What will Happen Next? Forecasting Player Moves in Sports Videos", Proceedings of the IEEE International Conference on Computer Vision, 2017, 10 pages.
Su, et al., "Social Behavior Prediction from First Person Videos", arXiv preprint arXiv:1611.09464, Nov. 29, 2016, 10 pages.
Koren, et al., "Matrix Factorization Techniques For Recommender Systems", Computer, IEEE Computer Society, Aug. 2009, 8 pages.
Deng, et al., "Factorized Variational Autoencoders for Modeling Audience Reactions to Movies", Proceedings of the IEEE Conference on Computer Vision and Pattern Recognition, 2017, 10 pages.
Charles, et al., "Personalizing Human Video Pose Estimation", Proceedings of the IEEE conference on computer vision and pattern recognition, 2016, 14 pages.
Kingman, et al., "Auto-Encoding Variational Bayes", arXiv preprint arXiv:1312.6114, May 1, 2014, 14 pages.
Gregor, et al., "DRAW: A Recurrent Neural Network For Image Generation", arXiv preprint arXiv:1502.04623, May 20, 2015, 10 pages.
Bowman, et al., "Generating Sentences from a Continuous Space", arXiv preprint arXiv:1511.06349, May 12, 2016, 12 pages.
Kingma, et al., "Semi-supervised Learning with Deep Generative Models", Advances in neural information processing systems, Oct. 31, 2014, 9 pages.
Sohn, et al., "Learning Structured Output Representation using Deep Conditional Generative Models", Advances in neural information processing systems, 2015, 9 pages.
Van den Oord, et al., "Pixel Recurrent Neural Networks", arXiv preprint arXiv:1601.06759, Aug. 19, 2016, 11 pages.
Pathak, et al., "Contect Encoders: Feature Learning by Inpainting", Proceedings of the IEEE conference on computer vision and pattern recognition, 2016, 12 pages.
Walker, et al., "An Uncertain Future: Forecasting from Static Images using Variational Autoencoders", European Conference on Computer Vision, 2016, 17 pages.
CD160 isoforms and regulation of CD4 and CD8 T-cell responses, Authors: Mohamed El-Far, Charles Pellerin, Louise Pilote, Jean-Francois Fortin, Ivan A D Lessard, Yoav Peretz, Elizabeth Wardrop, Patrick Salois, Richard C Bethell, Michael G Cordingley, George Kukolj, Publication data: Journal of Translational Medicine,,Sep. 2, 2014, BioMed Central, Source info: vol. 12, Nr: 1, p. 217,.
Extended European Search Report for European Application No. 16876628.5, mailed Jan. 29, 2020, 17 Pages.
Extended European Search Report for European Application No. 19740811.5, mailed Sep. 21, 2021, 10 Pages.
Extended European Search Report for European Application No. 19741311.5, mailed Sep. 15, 2021, 09 Pages.
Extended European Search Report for European Application No. 19741603.5, mailed Jun. 2, 2022, 11 Pages.
Extended European Search Report for European Application No. 19741793.4, mailed Jun. 28, 2022, 10 Pages.
Extended European Search Report for European Application No. 20765556.4, mailed Oct. 7, 2022, 12 Pages.
International Preliminary Report on Patentability for International Application No. PCT/US2016/066733, mailed Jun. 28, 2018, 9 Pages.
International Preliminary Report on Patentability for International Application No. PCT/US2019/014608, mailed Jul. 30, 2020, 10 Pages.
International Preliminary Report on Patentability for International Application No. PCT/US2019/014609, mailed Jul. 30, 2020, 08 Pages.
International Preliminary Report on Patentability for International Application No. PCT/US2019/014613, mailed Jul. 30, 2020, 07 Pages.
International Preliminary Report on Patentability for International Application No. PCT/US2019/014614, mailed Jul. 30, 2020, 6 Pages.
International Preliminary Report on Patentability for International Application No. PCT/US2020/020432, mailed Sep. 16, 2021, 10 Pages.
International Preliminary Report on Patentability for International Application No. PCT/US2020/032053, mailed Nov. 18, 2021, 08 Pages.
International Preliminary Report on Patentability for International Application No. PCT/US2021/016583, mailed Aug. 18, 2022, 11 Pages.
International Preliminary Report on Patentability for International Application No. PCT/US2021/034568 , mailed Dec. 15, 2022, 8 Pages.
International Search Report and Written Opinion for International Application No. PCT/US2020/020432, mailed May 28, 2020, 11 Pages.
International Search Report and Written Opinion for International Application No. PCT/US2020/032053, mailed Sep. 29, 2020, 09 Pages.
Partial Supplementary European Search Report for European Application No. 16876628.5, mailed Aug. 14, 2019, 16 Pages.
The CD160/\+ CD8/\h/\i/\g/\h cytotoxic T cell subset correlates with response to HAART in HIV-1+ patients, Authors: Nikolova, Muhtarova M H, Taskov M N, Kostov H B, Vezenkov K, Mihova L, Boumsell A, Bensussan L, A, Publication data: Cellular Immunology,,Oct. 1, 2005,Academic Press, San Diego, CA, US, Source info: vol. 237, Nr: 2, pp. 96-105,.
Wei X., et al., "Large-Scale Analysis of Formations in Soccer," Proceedings of the Digital Image Computing: Technqiues and Applications (DICTA), IEEE, Nov. 26, 2013, pp. 1-8, XP032536466, DOI:10.1109/DICTA.2013.6691503.
Wei X., et al., "Predicting Serves in Tennis Using Style Priors," Proceedings of the 21th ACM SIGKDD International Conference on Knowledge Discovery and Data Mining, 2015, 9 pages.
Blaikie, et al., "NFL & NCAA Football Prediction using Artificial Neural network," Proceedings of the Midstates Conference for Undergraduate Research in Computer Science and Mathematics, 2011, 8 pages.
Zhao, Yu, et al., "Applying deep bidirectional LSTM and mixture density network for basketball trajectory prediction," Optik, 2018, pp. 266-272.
Pourmehr, et al., "An overview on opponent modeling in RoboCup soccer simulation 2D," Springer, 2011, pp. 402-414.

(56) References Cited

OTHER PUBLICATIONS

Hubacek, et al., "Lifted Relational Team Embeddings for Predictive Sports Analytics," ILP Up-and-Coming/Short Papers, 2018, 7 pages.
Maher, "Modelling Association Football Scores", Statistica Neerlandica 36, nr.3, Published 1982, pp. 109-118.
Dixon, et al., "Modelling Association Football Scores and Inefficiencies in the Football Betting Market", Appl Statist 46. No. 2, Published 1997, pp. 265-280.
Koopman, et al., "A dynamic bivariate Poisson model for analysing and forecasting match results in the English Premier League", Dated Sep. 24, 2012, 30 pages.
Boshnakov, et al., "A Bivariate Weibull Count Model For Forecasting Association Football Scores", Dated Sep. 9, 2016, 13 pages.
Boice, "How Our Club Soccer Projections Work", Five ThirtyEight, https://fivethirtyeight.com/features/how-our-club-soccer-projections-work/, Dated Jan. 19, 2017, 6 pages.
Goddard, et al., "Modelling football match results and the efficiency of fixed-odds betting", Published 2004, 27 pages.
Huang, et al., "A Neural Network Method for Prediction of 2006 World Cup Football game", Published 2010 IEEE, 8 pages.
Kharrat, et al., "Plus-Minus Player Ratings for Soccer", arXiv:1706.04943v1, Dated Jun. 16, 2017, 17 pages.
Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, Dated May 15, 2017, 4 pages.
Beuoy, "Updated NBA Win Probability Calculator", InPredictable, http://www.inpredictable.com/2015/02/updated-nba-win-probability-calculator.html, Dated Feb. 6, 2015, 4 pages.
Asif, et al., "In-Play forecasting of win probability in One-Day International cricket: A dynamic logistic regression model", International Journal of Forecasting 32, Published 2016, pp. 34-43.
Pelechrinis, "iWinRNFL: A Simple, Interpretable & Well-Calibrated In-Game Win Probability Model for NFL", arXiv:1704.00197v3, Dated Mar. 14, 2018, 7 pages.
Lock, et al., "Using random forests to estimate win probability before each play of an NFL game", JQAS 2014; 10(2); Published 2014, pp. 197-205.
Schechtman-Rock, "Introducing NFLWin: An Open Source Implementation of NFL Win Probability", PhD Football, http://phdfootball.blogspot.com/2016/09/introducing-nflwin-open-source.html, Dated Sep. 1, 2016, 4 pages.
Bishop, "Mixture Density Networks", Neural Computing Research Group Report, NCRG/94/004, Dated Feb. 1994, 26 pages.
Kingma, et al., "Adam: A Method for Stochastic Optimization", arXiv:1412.6980v9, ICLR 2015, Dated Jan. 30, 2017, 15 pages.
Paine, "The Pats' Comeback Was Incredible—Even If You Think The Falcons Blew It", Five ThirtyEight, https://fivethirtyeight.com/features/patriots-falcons-comeback-super-bowl/, Dated Feb. 6, 2017, 4 pages.
Deerwester, et al., "Indexing by Latent semantic Analysis", Published 1990, 34 pages.
Blei, et al., "Latent Dirichlet Allocation", Journal of Machine Learning Research 3, Published 2003, pp. 993-1022.
Bengio, et al., "A Neural Probabilistic Language Model", Journal of Machine Learning Research 3, Published 2003, pp. 1137-1155.
Mikolov, et al., "Efficient Estimation of Word Representations in Vector Space", arXiv:1301.3781v3, Dated Sep. 7, 2013, 12 pages.
Mikolov, et al., "Distributed Representations of Words and Phrases and their Compositionality", Published 2013, 9 pages.
Ho, "Random Decision Forests", Published 1995 IEEE, pp. 278-282.
Van den Oord, et al., "WaveNet: A Generative Model For Raw Audio", arXiv:1609.03499v2, Dated Sep. 19, 2016, 15 pages.
Chung, et al., "Hierarchical Multiscale Recurrent Neural Networks", ICLR 2017, arXiv:1609.01704v7, Dated Mar. 9, 2017, 13 pages.
Graves, "Generating Sequences with Recurrent Neural Networks", arXiv:1308.0850v5, Dated Jun. 5, 2014, 43 pages.
Wei, "Modelling and Predicting Adversarial Behavious using Large Amounts of Spatiotemporal Data," Queensland University of Technology, 2016, 164 pages.
Al-Shboul, et al., "Automated Player Selection for Sports Team using Competitive Neural Networks", International Journal of Advanced Computer Science and Applications (IJACSA), vol. 8, No. 8, 2017, pp. 457-460.
International Search Report and Written Opinion for PCT Application No. PCT/US2019/014609, dated Apr. 12, 2019, 10 pages.
International Search Report and Written Opinion for PCT Application No. PCT/US2019/014613, dated Apr. 12, 2019, 9 pages.
Yue, et al., "Learning Fine-Grained Spatial Models for Dynamic Sports Play Prediction", ICDM, 2014, 10 pages.
International Search Report and Written Opinion for PCT Application No. PCT/US2016/066733, dated Apr. 17, 2017, 11 pages.
Sha, et al., "Chalkboarding: A New Spatiotemporal Query Paradigm for Sports Play Retrieval", IUI, 2016, 12 pages.
Cox, et al., "Least Squares Congealing for Unsupervised Alignment of Images", CVPR, 2008, 8 pages.
Hinton, et al. "A Fast Learning Algorithm for Deep Belief Nets", Neural Comput, 18(7), 2006, pp. 1527-1554.
Learned-Miller, "Data Driven Images Models through Continuous Joint Alignment", IEEE Transactions on Pattern Analysis and Machine Intelligence, vol. 28, No. 2, Feb. 2006, pp. 236-250.
Lucey, et al., "Representing and Discovering Adversarial Team Behaviors using Player Roles," CVPR, 2013, 8 pages.
Miller, et al., "Factorized Point Process Intensities: A Spatial Analysis of Professional Basketball", ICML, Jan. 8, 2014, 13 pages.
Peng, et al., "RASL: Robust Alignment by Sparse and Low-rank Decomposition for Linearly Correlated Images", PAMI, vol. 34, No. 11, 2012, 8 pages.
PCT International Application No. PCT/US22/77383, International Search Report and Written Opinion of the International Searching Authority, dated Dec. 13, 2022, 15 pages.
PCT International Application No. PCT/US22/76934, International Search Report and Written Opinion of the International Searching Authority, dated Dec. 13, 2022, 10 pages.
ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears, Aug. 4, 2017, 18 pages.
Pulling, "Long Corner Kicks In The English Premier League: Deliveries Into The Goal Ara And Critical Area", Kinesiology: International journal of fundamental and applied kinesiology 47.2, 2015, pp. 193-201.
Casal, et al., "Analysis of Corner Kick Success in Elite Football", International Journal of Performance Analysis in Sport 2015, pp. 430-451.
Bialkowski, et al., "Large-Scale Analysis of Soccer Matches using Spatiotemporal Tracking Data", IEEE International Conference on Data Mining, 2014, 6 pages.
Lucey, et al., "Quality vs Quantity: Improved Shot Prediction in Soccer using Strategic Features from Spatiotemporal Data", 9th Annual MIT Sloan Sports Analytics Conference, Feb. 27-28, 2015, 9 pages.
Le, et al., "Data-Driven Ghosting using Deep Imitation Learning", MIT Sloan Sports Analytics Conference, Mar. 3-4, 2017, 15 pages.
Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.
Ross, et al., "Shortcomings in the attribution process: On the origins and maintenance of erroneous social assessments", Cambridge University Press, 1982, pp. 129-152.
Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.
Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.

(56) References Cited

OTHER PUBLICATIONS

Frey, et al., "Clustering by Passing Messages Between Data Points" Science Magazine, Feb. 15, 2007, 23 pages.
Anderson, et al., "The Nos. Game: Why Everything You Know About Soccer is Wrong", 2013, Penguin Books,.
Examination Report No. 1 for Australian Patent Application No. 2022201634 dated Mar. 7, 2023, 4 Pages.
Extended European Search Report for Application No. 20801519.8, dated May 19, 2023, 7 pages.
International Preliminary Report on Patentability for the Application No. PCT/US2021/053117, mailed Apr. 13, 2023, 8 pages.
Office Action for European Patent Application No. 20801519.8, mailed Jun. 6, 2023, 1 page.
Merhej, et al., "What Happened Next? Using Deep Learning to Value Defensive Actions in Football Event-Data," KDD, Aug. 2021, pp. 3394-3403.
PCT International Application No. PCT/US22/15240, International Search Report and Written Opinion of the International Searching Authority, dated May 11, 2022, 7 pages.
Carney, et al., "Predicting probability distributions for surf height using an ensemble of mixture density networks," Proceedings of the 22nd international conference on Machine learning, 2005, 8 pages.
Ji, et al., "NBA All-Star lineup prediction based on neural networks," 2013 International Conference on Information Science and Cloud Computing Companion, 2013, pp. 864-869.
Pettersson, et al., "Football match prediction using deep learning, " Department of Electrical Engineering, Chalmers University of Technology, 2017, 72 pages.
Dinsdale, et al., "Interactive Gaming in Sports," U.S. Appl. No. 17/934,756, filed Sep. 23, 2022, 39 pages.
PCT International Application No. PCT/US22/17229, International Search Report and Written Opinion of the International Searching Authority, dated Jun. 9, 2022, 9 pages.
PCT International Application No. PCT/US22/18709, International Search Report and Written Opinion of the International Searching Authority, dated Jun. 24, 2022, 11 pages.
Huang, et al., "Graph Analysis of Major League Soccer Networks: CS224W Final Project," http://snap.stanford.edu/class/cs224w-2018/reports/CS224W-2018-46.pdf, Dec. 9, 2018, 9 pages.
Tian, et al., "Use of machine learning to automate the identification of basketball strategies using whole team player tracking data," Applied Sciences 10.1, Dec. 18, 2019, 17 pages.
PCT International Application No. PCT/US21/34568, International Search Report and Written Opinion of the International Searching Authority, dated Aug. 25, 2021, 9 pages.
Wagenaar, et al. "Using deep convolutional neural networks to predict goal-scoring opportunities in soccer," International Conference on Pattern Recognition Applications and Methods, vol. 2, Scitepress, 2017, 8 pages.
Stein, et al. "Bring it to the pitch: Combining video and movement data to enhance team sport analysis," IEEE transactions on visualization and computer graphics 24.1,2017,, pp. 13-22.
Liu, G. et al., "Deep soccer analytics: learning an action-value function for evaluating soccer players", Journal of Data Mining and Knowledge Discovery, Norwell, MA, US, vol. 34, No. 5, Jul. 21, 2020, pp. 1531-1559, XP037244074.
Yeh, R. A. et al., "Diverse Generation for Multi-Agent Sports Games", 2019 IEEE/CVF Conference on Computer Vision and Pattern Recognition (CVPR), IEEE, Jun. 15, 2019, pp. 4605-4614, XP033686954.

* cited by examiner

200

SYSTEM AND METHOD FOR EVALUATING DEFENSIVE PERFORMANCE USING GRAPH CONVOLUTIONAL NETWORK

CROSS-REFERENCE TO RELATED APPLICATIONS

This application claims priority to U.S. Application Ser. No. 63/146,039, filed Feb. 5, 2021, and U.S. Application Ser. No. 63/164,932, filed Mar. 23, 2021, which are hereby incorporated by reference in their entireties.

FIELD OF THE DISCLOSURE

The present disclosure generally relates to systems and methods for modeling defensive behavior and determining its effect on attacking behavior.

BACKGROUND

The art of good defense in sports is to prevent something from happening before it has even happened. While there are many players across sports that are revered for their defensive abilities, today's statistics fail to acknowledge or quantify this aspect of an individual's defensive abilities. For example, in soccer, while there are statistics related to a defender's contribution as measured by the number of tackles or interceptions that they make, there is currently no means for measuring actions that have been prevented before they were made or occurred. Generally, the aim of a defense and a defender is to make offensive play predictable. If the art of good defense is to make play predictable, then it should also be measurable.

SUMMARY

In some embodiments, a method is disclosed therein. A computing system retrieves tracking data from a data store. The tracking data includes a plurality of frames of data for a plurality of events across a plurality of seasons. The computing system converts the tracking data into a plurality of graph-based representations. The prediction engine learns to model defensive behavior based on the plurality of graph-based representations by learning, by a first graph neural network, to predict a likelihood of a pass being completed at any moment within a possession, learning, by a second graph neural network, to predict a likelihood of a shot occurring within the possession, and learning, by a third graph neural network, the predict a likelihood of each player becoming a pass receiver within the possession. The computing system generates a trained prediction engine based on the learnings. The computing system receives target tracking data for a target event. The target tracking data includes a plurality of target frames. The computing system converts the target tracking data to a plurality of target graph-based representations. Each graph-based representation corresponds to a target frame of the plurality of target frames. The computing system models, via the trained graph neural network, defensive behavior of a team in the target event based on plurality of graph-based representations.

In some embodiments, a system is disclosed herein. The system includes a processor and a memory. The memory includes programming instructions stored thereon, which, when executed by the processor, causes the system to perform one or more operations. The one or more operations include retrieving tracking data from a data store. The tracking data includes a plurality of frames of data for a plurality of events across a plurality of seasons. The one or more operations further include converting the tracking data into a plurality of graph-based representations. The one or more operations further include learning, by a prediction engine, to model defensive behavior based on the plurality of graph-based representations by learning, by a first graph neural network, to predict a likelihood of a pass being completed at any moment within a possession, learning, by a second graph neural network, to predict a likelihood of a shot occurring within the possession, and learning, by a third graph neural network, the predict a likelihood of each player becoming a pass receiver within the possession. The one or more operations further include generating by the computing system, a trained prediction engine based on the learnings. The one or more operations further include receiving target tracking data for a target event. The target tracking data includes a plurality of target frames. The one or more operations further include converting the target tracking data to a plurality of target graph-based representations. Each graph-based representation corresponds to a target frame of the plurality of target frames. The one or more operations further include modeling, via the trained graph neural network, defensive behavior of a team in the target event based on plurality of graph-based representations.

In some embodiments, a non-transitory computer readable medium is disclosed herein. The non-transitory computer readable medium includes one or more sequences of instructions, which, when executed by one or more processors, causes a computing system to perform operations. The operations include retrieving, by the computing system, tracking data from a data store. The tracking data includes a plurality of frames of data for a plurality of events across a plurality of seasons. The operations further include converting, by the computing system, the tracking data into a plurality of graph-based representations. The operations further include learning, by a prediction engine, to model defensive behavior based on the plurality of graph-based representations by learning, by a first graph neural network, to predict a likelihood of a pass being completed at any moment within a possession, learning, by a second graph neural network, to predict a likelihood of a shot occurring within the possession, and learning, by a third graph neural network, the predict a likelihood of each player becoming a pass receiver within the possession. The operations further include generating, by the computing system, a trained prediction engine based on the learnings. The operations further include receiving, by the computing system, target tracking data for a target event. The target tracking data includes a plurality of target frames. The operations further include converting, by the computing system, the target tracking data to a plurality of target graph-based representations. Each graph-based representation corresponds to a target frame of the plurality of target frames. The operations further include modeling, by the computing system via the trained graph neural network, defensive behavior of a team in the target event based on plurality of graph-based representations.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein generally relate to a system and method for modeling defensive behavior and determining its effect on attacking behavior, i.e., preventing actions before they have occurred. For example, given tracking data, which can be highly unstructured and variable, one or more techniques described herein may leverage a plurality of graph convolutional neural networks (GNNs) to forecast or predict player behavior.

Tracking data is typically highly unstructured and can be difficult to model due to most machine learning techniques conventionally requiring tabular datasets, where features are inserted in a specific order. Conventional approaches to solving this ordering issue suffer from a variety of defects. For example, in soccer, teams typically use different formations. As such, a player at role 10 for a team using a 4-3-3 formation would be very different for a team playing a 3-5-2 formation. Therefore, it is difficult to compare predictions between these players. Further, conventional approaches to solving this ordering issue are reliant upon teams having the same number of players on the pitch or playing surface. As a result, different models must be learned when players have been sent off the pitch or playing surface. Still further, these conventional approaches suffer when deployed in real-time (or near real-time), because of the speed at which players need to be aligned before calculating features for real-time inference.

Additionally, there have been several approaches to circumventing the ordering/alignment issue while predicting probabilistic pitch control surfaces using convolutional neural networks (CNNs). To do so, these approaches must convert the tracking data into an image representation prior to being input into the CNNs. Such conversion of tracking data directly into images, however, is suboptimal as it sacrifices a very low-dimensional data set and converts it into a high-dimensional sparse representation of the data. Tracking data generally has an irregular structure due to missing players and a lack of clear scheme to order players in a sequence of frame. Additionally, such techniques are also time consuming and could cause issues for future generations of real-time applications.

Accordingly, to improve conventional processes, the one or more techniques leverage the use of GNNs to forecast or predict player behavior. By using GNNs, the present technique neglects the need for ordering features, can cope with varying number of players on the pitch or playing surface, and can learn local and higher scale features directly from the tracking data (instead of having to be converted to an image representation).

Figure 1:
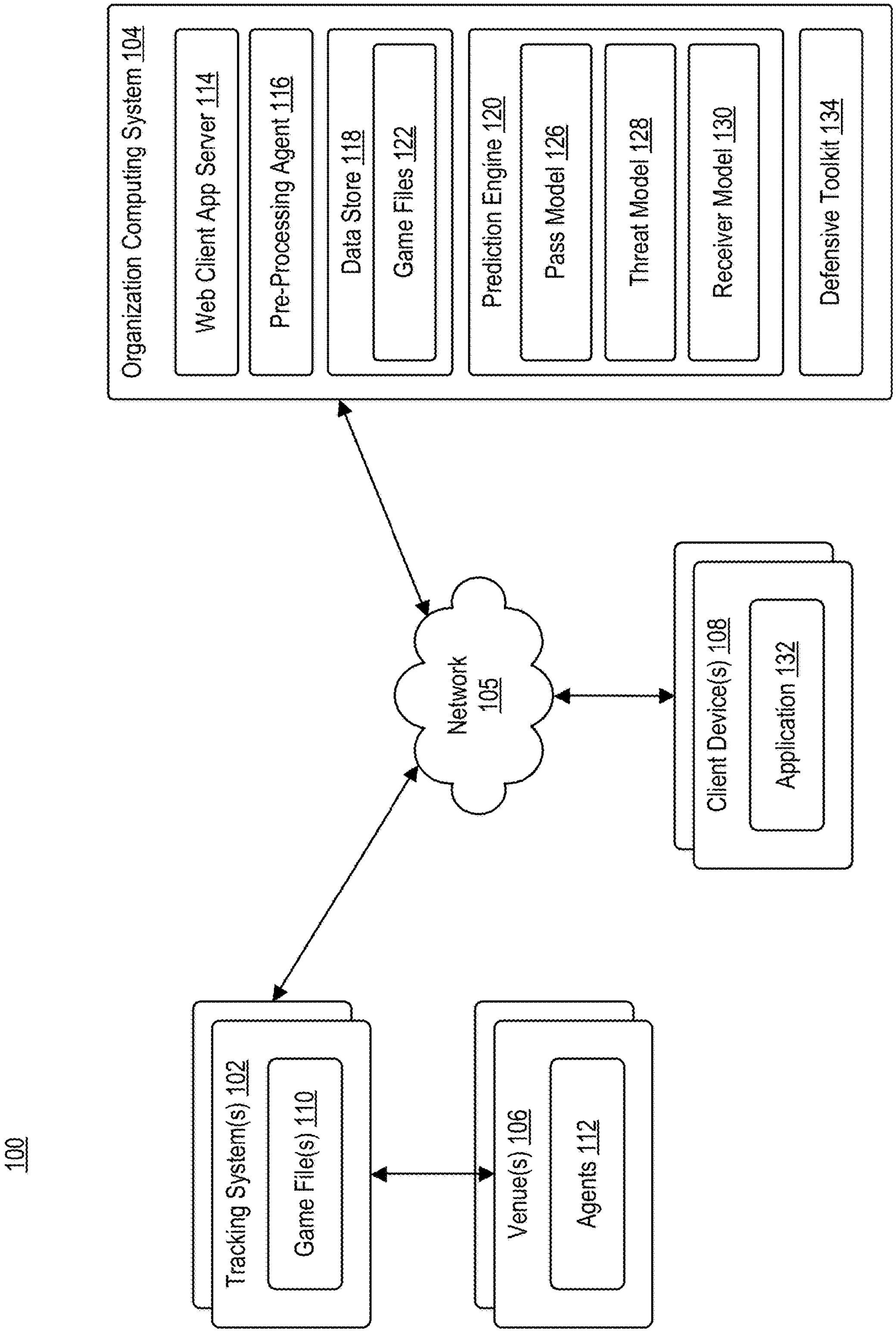
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, and prediction engine 120. Each of pre-processing agent 116 and prediction engine 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 122. Each game file 122 may include data of a given match. For example, the data may correspond to a plurality of positional information for each agent captured by tracking system 102. In some embodiments, the data may correspond to broadcast data of a given match, in which case, the data may correspond to a plurality of positional information for each agent from the broadcast feed of a given match. Generally, such information may be referred to herein as "tracking data." For example, tracking data may be extracted from video frames of the broadcast feed. Generally, tracking data may refer to the positions of the players/ball on the playing surface.

Pre-processing agent 116 may be configured to process data retrieved from data store 118. For example, pre-processing agent 116 may be configured to generate one or more sets of information that may be used with prediction engine 120. Pre-processing agent 116 may be further configured to generate a graph-based representation of tracking data for a given event. For example, for each game, pre-processing agent 116 may be configured to generate a plurality of graphs, with each graph corresponding to a frame of a respective game.

Generally, tracking data may include the x=(x, y) positions of each entity (or player) at each time step on a playing surface. In some embodiments, to represent the tracking data in a well-defined structure that avoids issues presented in conventional approaches, pre-processing agent 116 may construct a graphical representation of the tracking data. For example, pre-processing agent 116 may construct a graph G(V,E,U) that may be defined by nodes V, edges E, and global features U. In some embodiments, each node in a graph may represent the player and ball tracking data. In some embodiments, each edge may include information about various relationships between nodes. In some embodiments, edges $e_{ij}$ may be directed edges and connect a sending node $v_i$ to a receiving node $v_j$.

Prediction engine 120 may be configured to accurately model defensive behavior and its effect on attacking behavior. For example, prediction engine 120 may be configured to model a likelihood of preventing actions before they have occurred.

As shown, prediction engine 120 may include multiple models, each trained to model a specific outcome. In some embodiments, prediction engine 120 may include pass model 126, threat model 128, and receiver model 130. Each of pass model 126, threat model 128, and receiver model 130 may be representative of separate graph convolutional neural networks (GNNs), which are able to deal with the highly unstructured and variable tracking data to make predictions in real-time (or near real-time). Pass model 126 may be trained to predict how likely a pass would be completed to every attacker off the ball at any moment within a player possession. Threat model 128 may be trained to predict the probability of a shot occurring in the next x-seconds (e.g., next 10 seconds) if a pass was played to any attacker. Receiver model 130 may be trained to predict the likelihood of every player becoming the pass receiver at any moment within a player possession.

To train and validate each of pass model 126, threat model 128, and receiver model 130, historical tracking data from a plurality of games across a plurality of seasons of a sport was used. Although the present discussion focuses on the sport of soccer, those skilled in the art understand that the presently discussed techniques may be applied to other team sports, such as, but not limited to, basketball, rugby, hockey, and the like. In some embodiments, the historical tracking data may be sampled at around 10 Hz/second. In some embodiments, the historical tracking data may include (x, y) positions for each player and the ball at each frame, team and player identifiers (e.g., team IDs and player IDs) at each frame, time of each frame, current half of each frame, event identifier (e.g., event ID) of each frame, and the like.

In some embodiments, to train threat model 128, frames relating to the moment of passing events may be considered. In comparison, for pass model 126 and receiver model 130, tracking data from not only the individual passes but also the tracking data from before the pass may be used. For example, with respect to pass model 126, tracking data from one-half second (e.g., five frames) may be used. For example, with respect to receiver model 130, tracking data from one second (e.g., ten frames) may be used. Including tracking data prior to each passing event may allow prediction engine 120 to achieve a semantic regularization during training that may prevent pass model 126 and receiver model 130 from overfitting to the pass moment where players' movement may already indicate where the ball will be played.

To learn relationships between the graph inputs and outputs, each GNN may include separate operations, or blocks, on the edges and nodes of the graph. An edge block may be defined by a neural network that takes inputs from the edge features, sending node features, and receiving node features, and may put a new edge embedding. Similarly, a node block may be defined by a neural network that takes inputs from the node features, aggregated sending edge features, aggregated receiving edge features, and may output a new node embedding. In some embodiments, a permutation invariant function may be used to aggregate the sending and receiving edge features, e.g., the mean or sum of those features.

In some embodiments, the GNN architecture of each of pass model 126, threat model 128, and receiver model 130 may include an edge block followed by a node block. In some embodiments, each block may include a multilayer perceptron having three layers. In some embodiments, the number of units in each layer may vary between tasks. In some embodiments, pass model 126 and receiver model 130 may have the same, or similar, network architecture structure. For example, the network architecture of pass model 126 and receiver model 130 may include a multi-layer perceptron with five layers (e.g., 30, 20, 15, 10, 5) at the edge block and five layers (e.g., 20, 15, 10, 5, 1) on the node block. In some embodiments, threat model 128 network architecture may include a multi-layer perceptron with three layers at the edge block (e.g., 15, 10, 5) and three layers at the node block (e.g., 10, 5, 1).

In some embodiments, by using an edge block in the GNN, prediction engine 120 may allow the GNN to learn the relationships between different nodes for each task. Such flexibility is absent from conventional approaches because conventional approaches typically define the connections between the inputs rather than allowing the model to learn the relationships between inputs.

Once trained, each of pass model 126, threat model 128, and receiver model 130 may be used, in real-time, to forecast or predict player behavior.

In some embodiments, prediction engine 120 may utilize the various GNNs (e.g., pass model 126, threat model 128, and/or receiver model 130) to detect "active runs" of offensive players. An "active run" may refer to a run (i.e., detected as a run or movement based on velocity). Detecting an active run may also improve the likelihood of the runner receiving the ball (e.g., output from receiver model 130).

In some embodiments, based on output from one or more of pass model 126, threat model 128, and/or receiver model 130, prediction engine 120 may detect each time a player makes an active run.

In some embodiments, organization computing system 104 may further include a defensive toolkit 134. Defensive toolkit 134 may allow for the introduction of new defensive concepts, based on the outputs generated by one or more of pass model 126, threat model 128, and receiver model 130. In some embodiments, defensive toolkit 134 may be configured to generate a player availability metric. For example, based on outputs generated by pass model 126 and receiver model 130, defensive toolkit 134 may be configured to infer how available every attacker is off the ball at each frame. In some embodiments, defensive toolkit 134 may be configured to generate a defensive impact metric. For example, based on outputs generated by one or more of pass model 126, threat model 128, and receiver model 130, defensive toolkit 134 may be configured to detect high level defensive concepts, such as, but not limited to, ball and man oriented defending, defensive position play, and/or off ball runs. Further, in some embodiments, defensive toolkit 134 may be configured to generate one or more disruption maps. In some embodiments, a disruption map may illustrate global representations of a defending teams' ability to disrupt to opposition's attacking strategy.

In some embodiments, defensive toolkit 134 may utilize predictions from pass model 126, threat model 128, and/or receiver model 130 to assign credit and/or blame to each defensive player. For example, defensive toolkit 134 may be able to determine whether a player is "pressing the ball" or "pressing the option." To do so, defensive toolkit 134 may look for changes in output from threat model 128 over a period of time and then may assign those values to each defensive player. Such metrics may allow defensive toolkit 134 to assign defensive values to each player. In some embodiments, such analysis may be extended to the team level.

In some embodiments, defensive toolkit 134 may maintain a running tally of active runs per player during a match. For example, defensive toolkit 134 may illustrate active runs per player or per role at a game-level, across a season, across player's career and the like. In some embodiments, such analysis may be performed at the team level using role assignment.

In some embodiments, defensive toolkit 134 may be further configured to perform conditional analysis, based on, for example, how far each active run was.

In some embodiments, defensive toolkit 134 may be further be configured to break down active runs based on various contexts. In some embodiments, active runs may be broken down into total distance, maximum distance, average distance per active run, the duration of the active runs, the max duration, and the average duration. In some embodiments, defensive toolkit 134 may further break down the active runs based on the distance of each run (e.g., <5 m, 5-10 m, 10-20 m, >20 m, etc.). In some embodiments, defensive toolkit 134 may further break down the active runs by illustrating where each active run occurred and the length (e.g., thickness of a line may show intensity of the run).

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
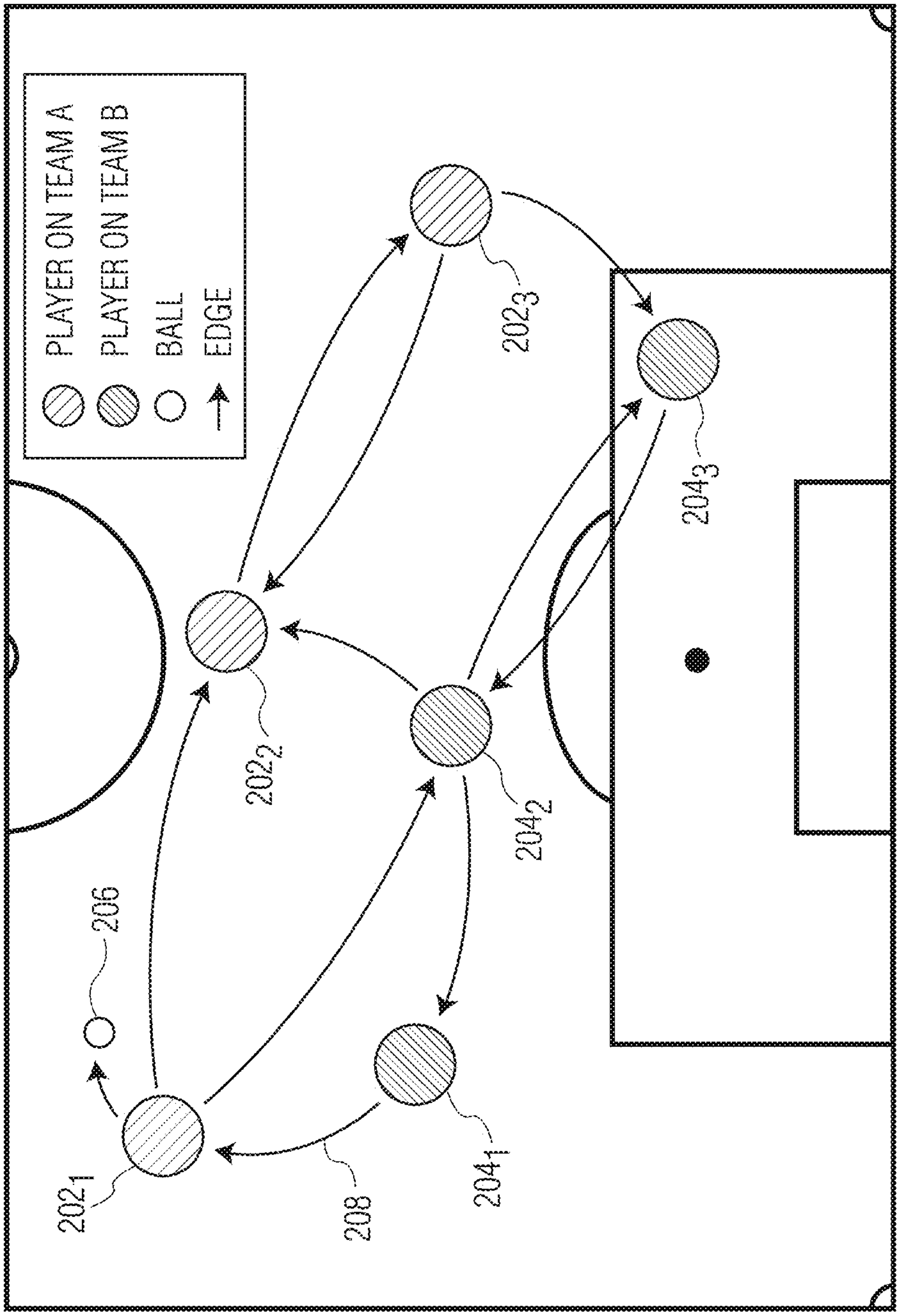
FIG. 2 illustrates a graph-based representation of a frame of an event, according to example embodiments.

FIG. 2 illustrates a graph-based representation of a frame of an event, according to example embodiments. As provided above, for each frame of an event, pre-processing agent 116 may generate a graph-based representation of the agents involved in the frame. For example, for each frame of a given event, pre-processing agent 116 may generate a graph-based representation of the agents and objects on the playing surface. The exemplary graph-based representation illustrated in FIG. 2 may represent a graph structure used to represent tracking data.

Graph 200 may include several nodes 202$_1$-202$_3$ (generally node 202) representing players on Team A, several nodes 204$_1$-204$_3$ (generally node 204) representing players on Team B, and a node 206 representing the ball. As shown, graph 200 may include a plurality of directed edges 208 connecting various nodes 202, 204, and 206. In some embodiments, edges 208 may be weighted to allow each model to learn which nodes are on which team.

Figure 3:
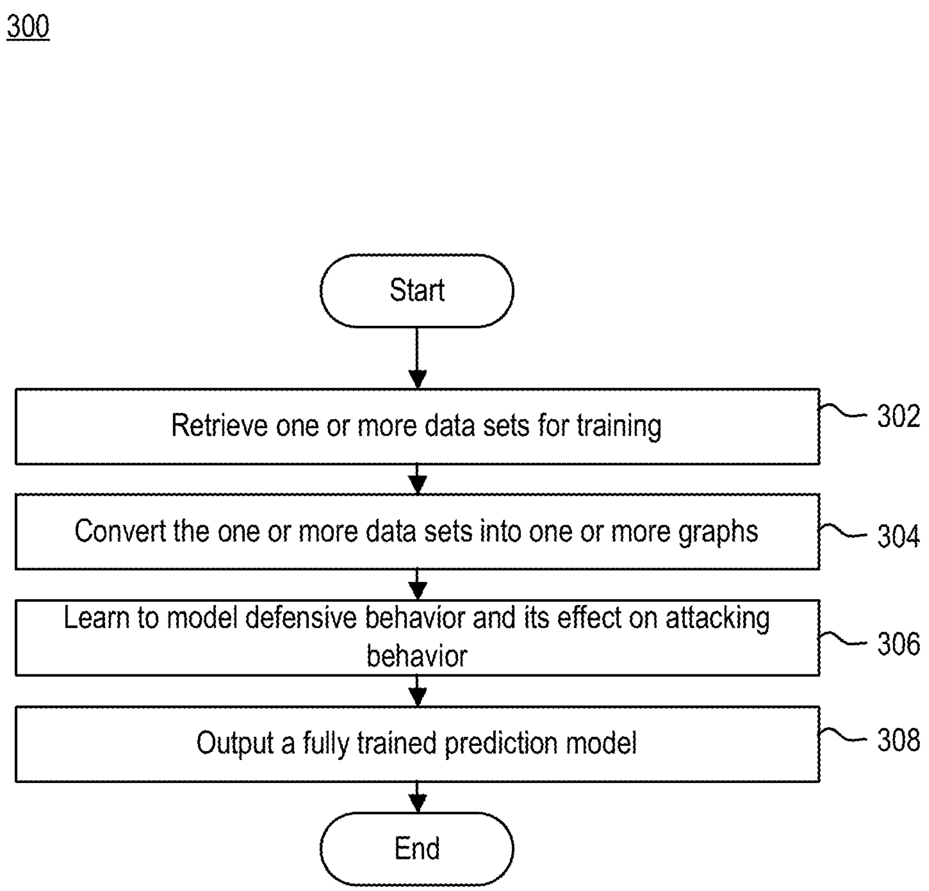
FIG. 3 is a flow diagram illustrating a method of generating trained prediction models, according to example embodiments.

FIG. 3 is a flow diagram illustrating a method 300 of generating trained prediction models, according to example embodiments. Method 300 may begin at step 302.

At step 302, organization computing system 104 may retrieve one or more data sets for training. For example, pre-processing agent 116 may retrieve a plurality of historical game files from data store 118. In some embodiments, each game file may include historical tracking information associated with a respective game. In some embodiments, the historical tracking data may be sampled at around 10 Hz/second. In some embodiments, the historical tracking data may include (x, y) positions for each player and the ball at each frame, team and player identifiers (e.g., team IDs and player IDs) at each frame, time of each frame, current half of each frame, event identifier (e.g., event ID) of each frame, and the like.

At step 304, organization computing system 104 may convert the plurality of data sets into a plurality of graphs. For example, pre-processing agent 116 may generate a plurality of graph-based representations of the tracking data for each game file of the plurality of historical game files. For each game, pre-processing agent 116 may be configured to generate a plurality of graphs, with each graph corresponding to a frame of a respective game.

Generally, tracking data may include the x=(x, y) positions of each entity (or player) at each time step on a playing surface. Pre-processing agent 116 may construct a graph G(V,E,U) that may be defined by nodes V, edges E, and global features U. In some embodiments, each node in a graph may represent the player and ball tracking data in a current frame. In some embodiments, each edge may include information about various relationships between nodes. In some embodiments, edges $e_{ij}$ may be directed edges and connect a sending node $v_i$ to a receiving node $v_j$.

In some embodiments, each node may include information stored therein. For example, node features may include, but are not limited to, player (x, y) position, speed, acceleration, angle of motion, distances and angle to an attacking goal or basket, distance to the ball carrier, difference in the angle of motion to the ball carrier, and a flag that indicates whether the player is the ball carrier. In some embodiments, each edge may include one or more features associated therewith. For example, edge features may include, but are not limited to, a flag defining the relationship between two nodes (e.g., teammate 2, opponent 1), distance between two players connected by the edge, difference in the angle of motion, and the like.

At step 306, prediction engine 120 of organization computing system 104 may learn, based on the one or more graphs, to accurately model defensive behavior and its effect on attacking behavior. In some embodiments, pass model 126 may learn to predict how likely a pass would be completed to every attacker off the ball at any moment within a player possession. Threat model 128 may learn to predict the probability of a shot occurring in the next x-seconds (e.g., next 10 seconds) if a pass was played to any attacker. Receiver model 130 may learn to predict the likelihood of every player becoming the pass receiver at any moment within a player possession.

In some embodiments, each unique GNN underlying a respective pass model 126, threat model 128, and receiver model 130 may be trained separately. For example, to train threat model 128, frames relating to the moment of passing events may be considered. To train pass model 126 and receiver model 130, tracking data from not only the individual passes but also the tracking data from before the pass may be used. For example, with respect to pass model 126, tracking data from one-half second (e.g., five frames) may be used. For example, with respect to receiver model 130, tracking data from one second (e.g., ten frames) may be used. Including tracking data prior to each passing event may allow prediction engine 120 to achieve a semantic regularization during training that may prevent pass model 126 and receiver model 130 from overfitting to the pass moment where players' movement may already indicate where the ball will be played.

In some embodiments, across different tasks, the nodes of the GNN may be weighted in the loss calculation to stabilize the training. For example, in some embodiments, the nodes representing defensive players may be masked out for each of pass model 126, threat model 128, and receiver model 130. In some embodiments, during training of pass model 126 and threat model 128, the only players that may be considered may be those that received the pass or were intended recipients of the pass. In some embodiments, during training of the receiver model 130, the intended receiver of a pass may have a weight of 1.0 and all other teammates of the ball carrier may have a weight of 0.1 to balance the signal to background.

At step 308, organization computing system 104 may output a set of fully trained prediction model. For example, at the end of training and testing processes, prediction engine 120 may include a fully trained pass model 126, threat model 128, and receiver model 130.

Figure 4:
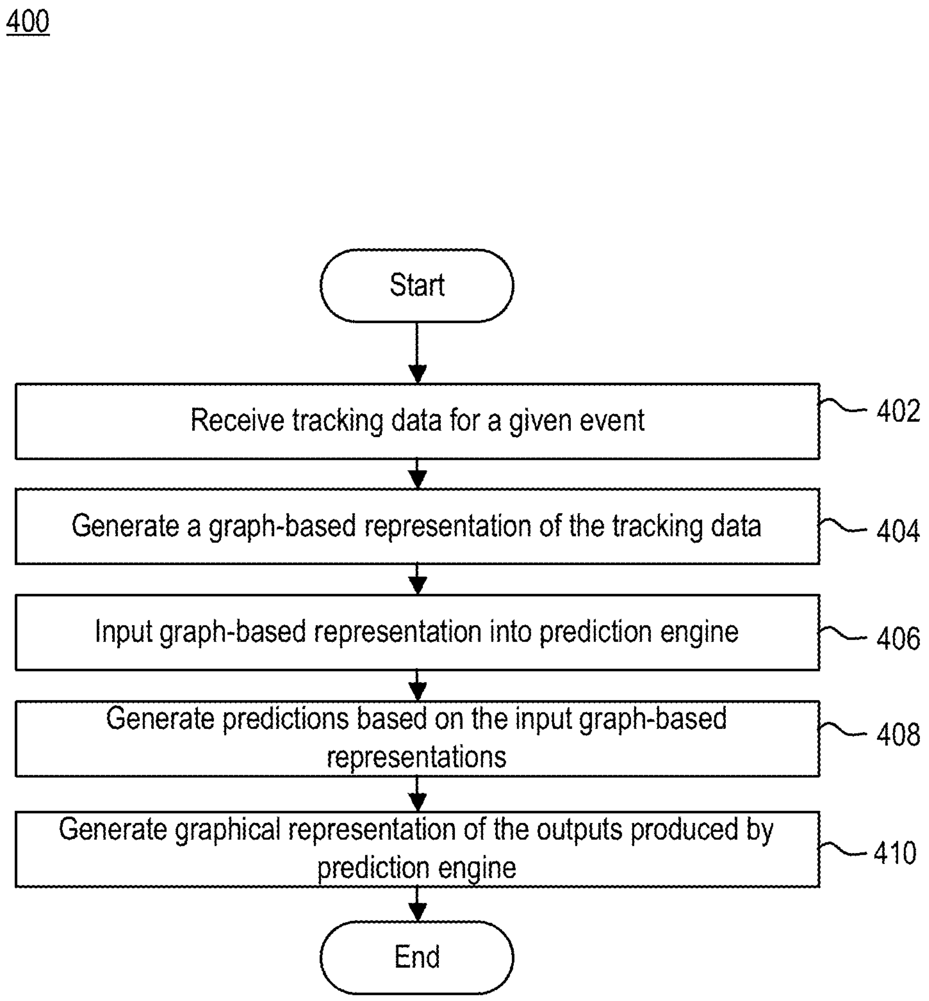
FIG. 4 is a flow diagram illustrating a method of modeling defensive behavior and determining its effect on attacking behavior, according to example embodiments.
Figure 5A:
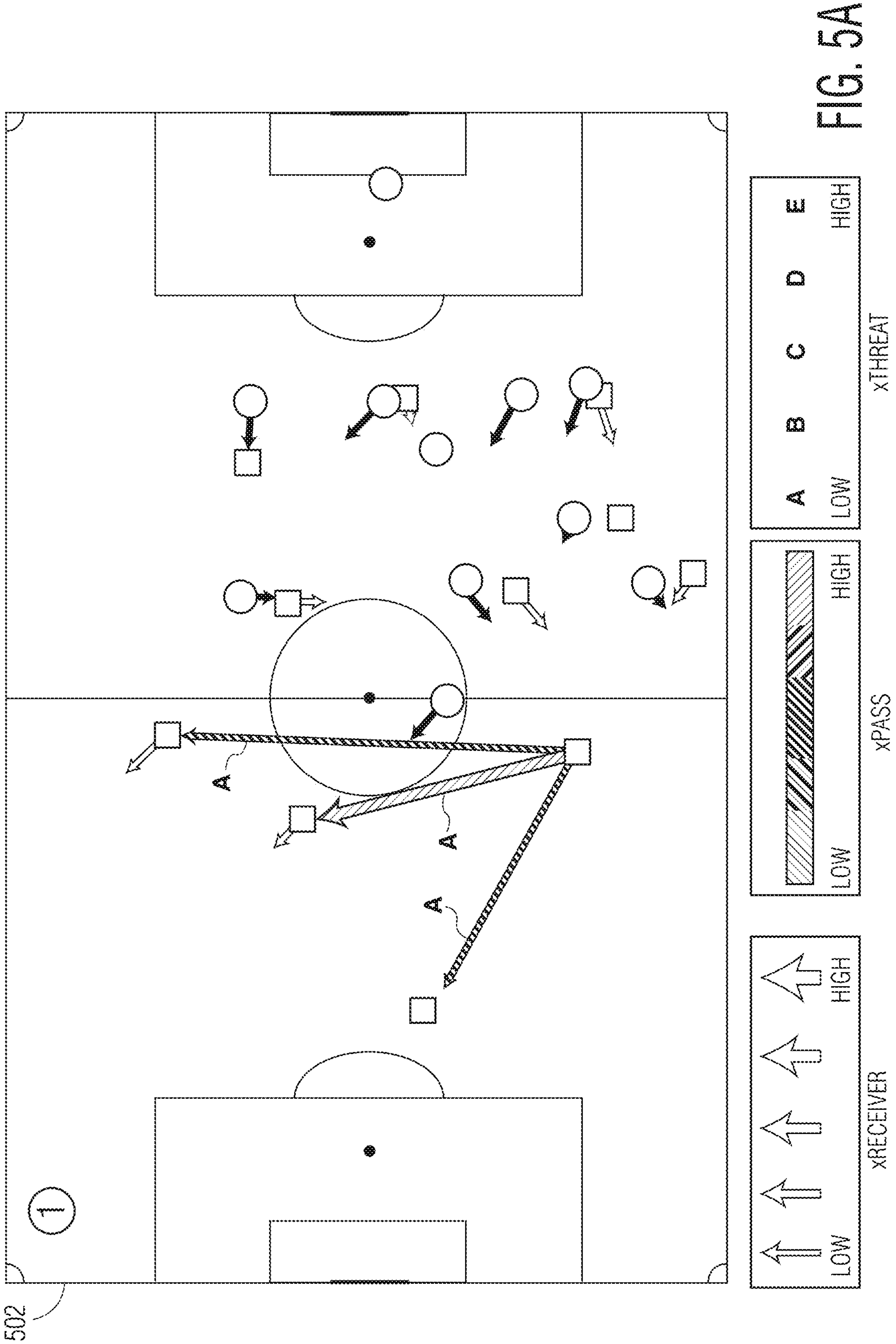
FIGS. 5A-5E illustrate an exemplary graphical representation of the outputs produced by prediction engine, according to example embodiments.
Figure 5B:
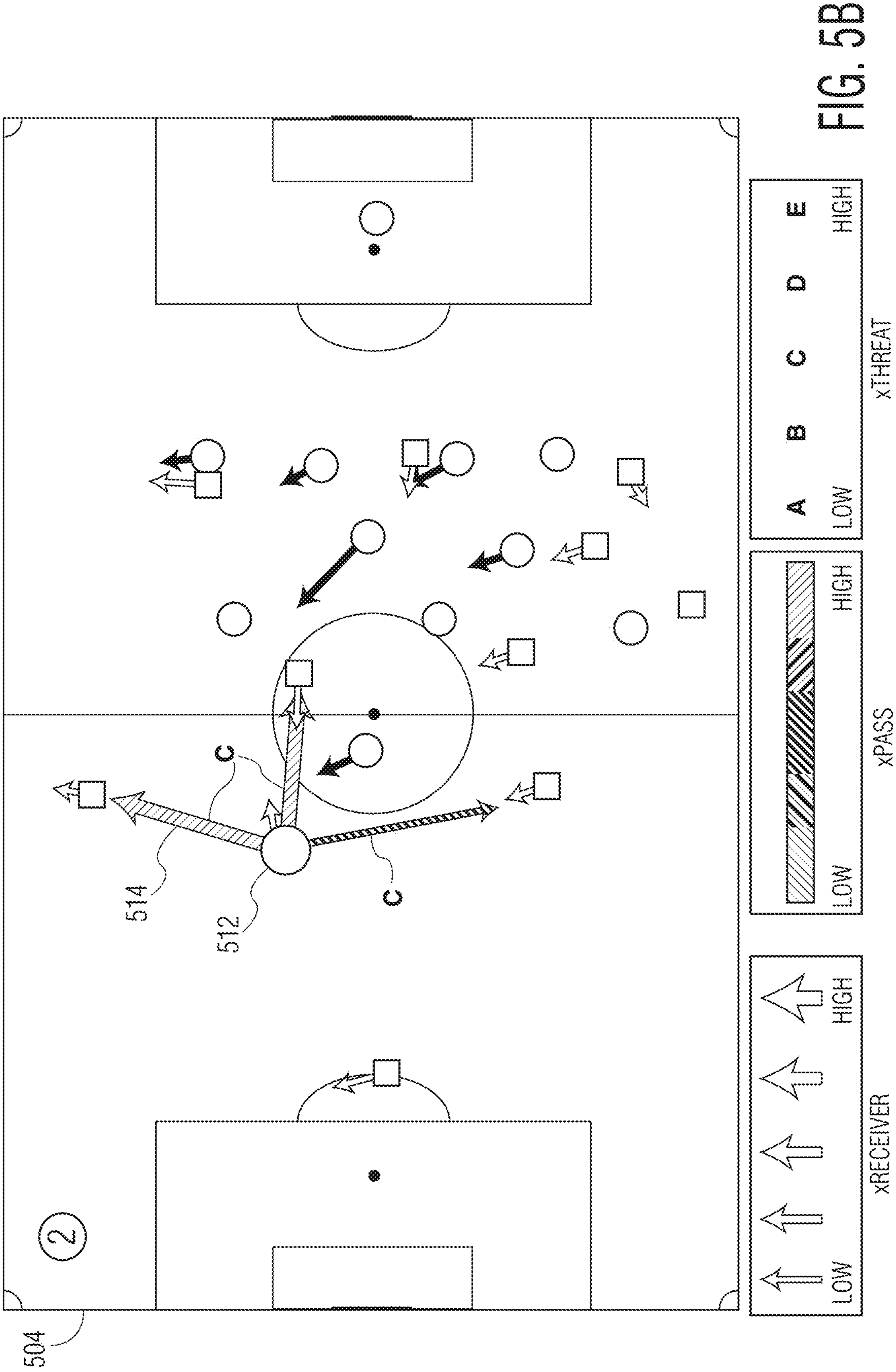
Figure 5C:
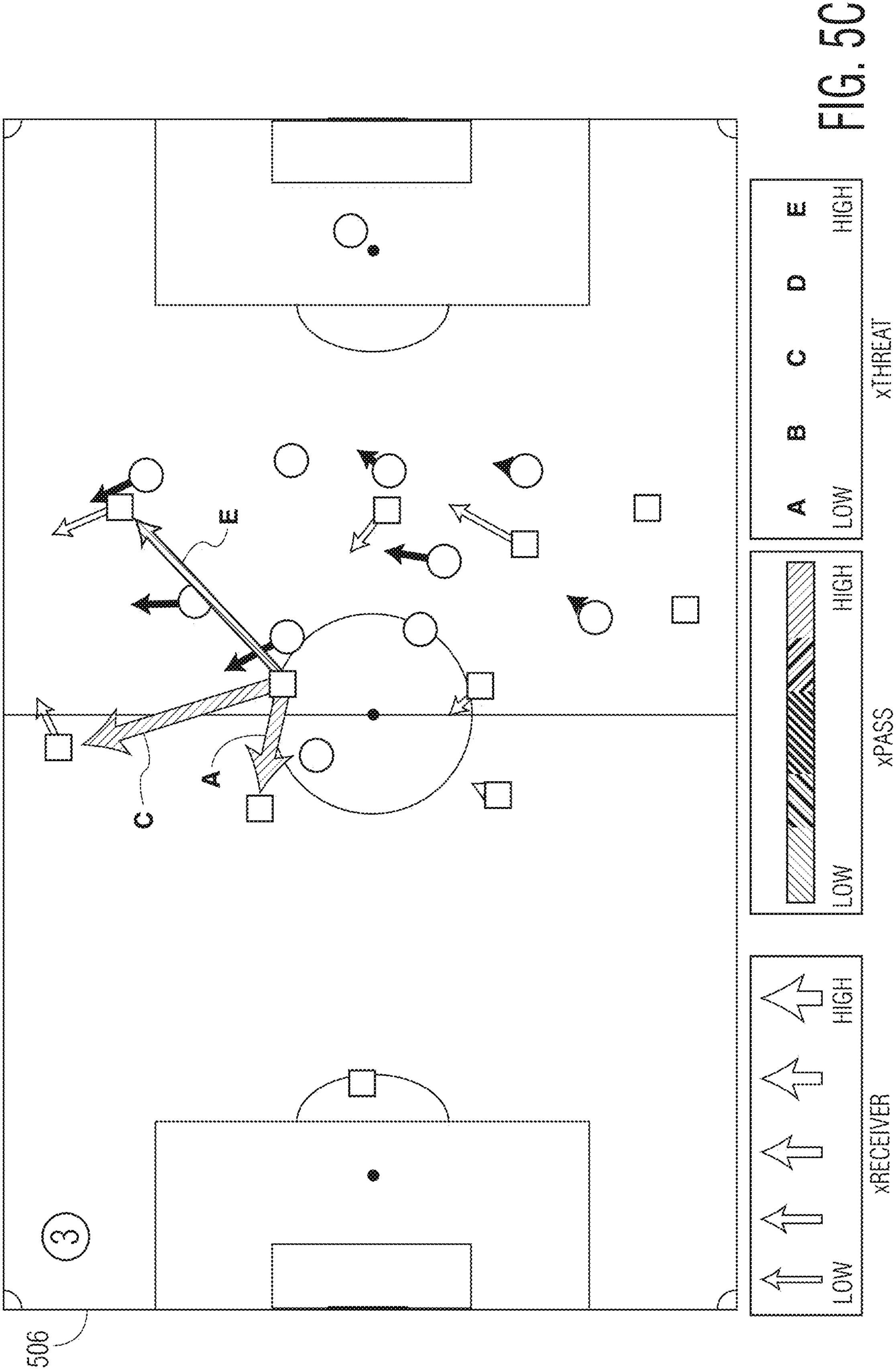
Figure 5D:
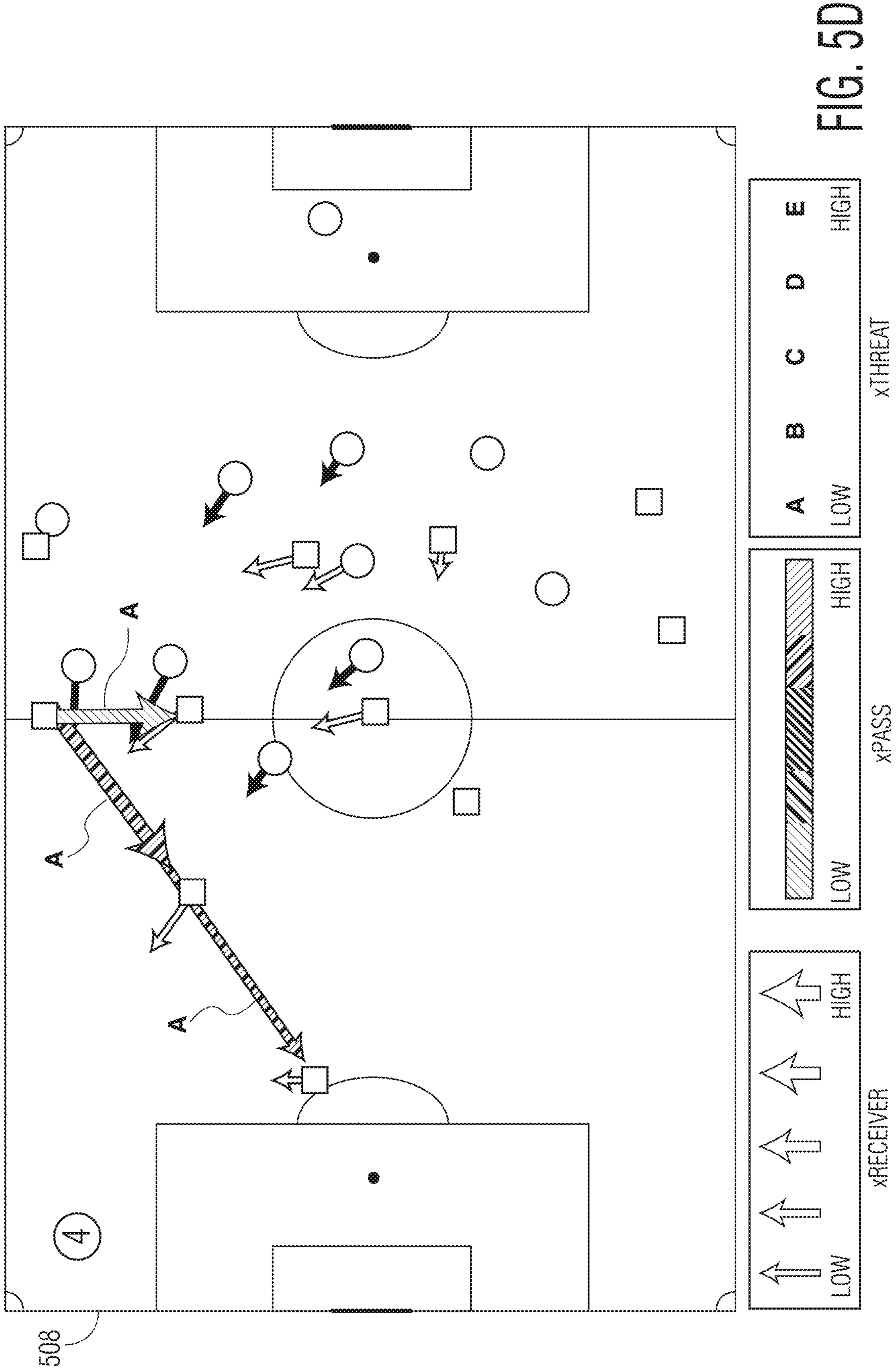
Figure 5E:
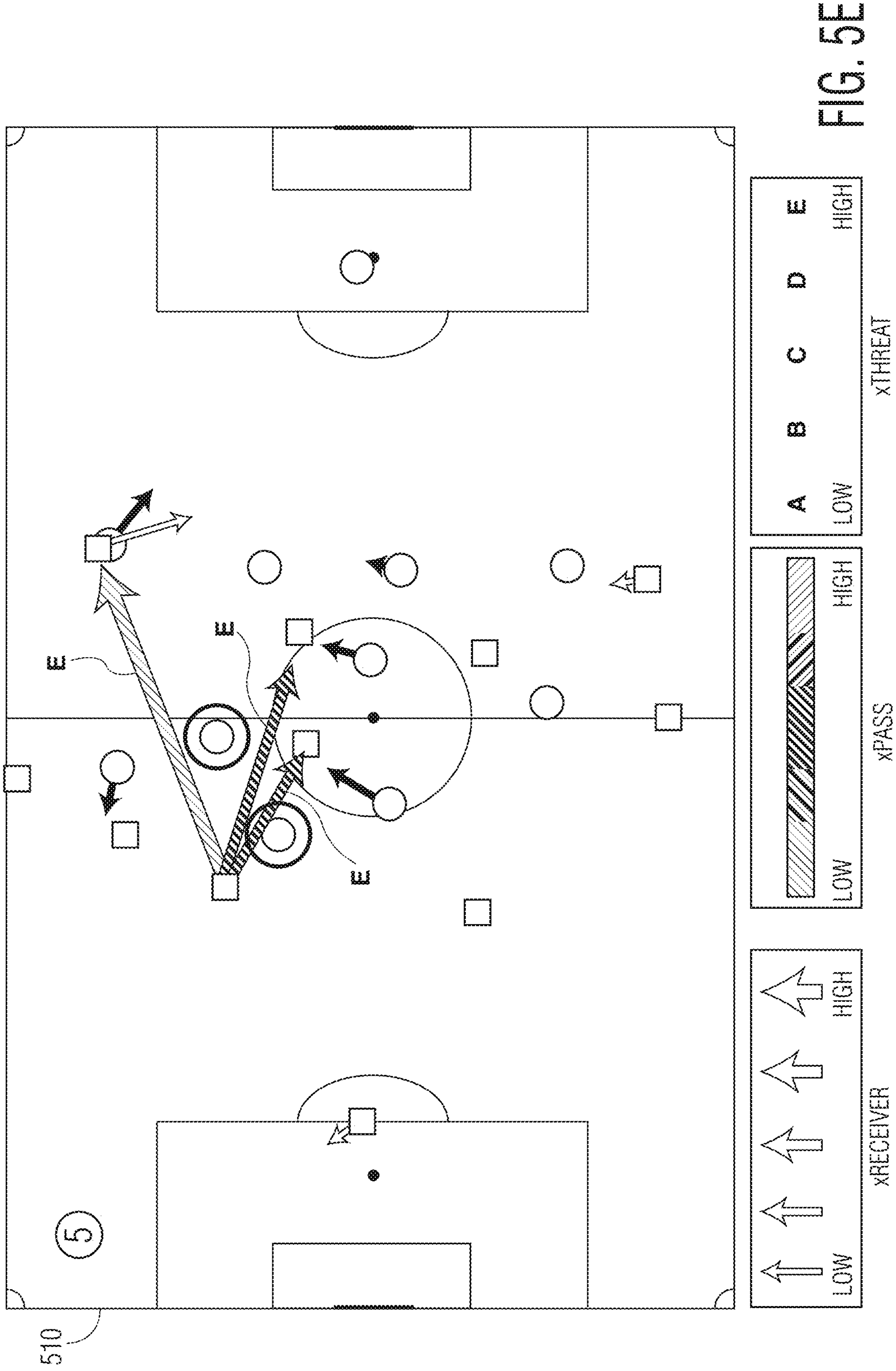

FIG. 4 is a flow diagram illustrating a method 400 of modeling defensive behavior and determining its effect on attacking behavior, according to example embodiments. Method 400 may begin at step 402.

At step 402, organization computing system 104 may receive tracking data for an event. In some embodiments, tracking data may be representative of real-time or near real-time tracking data for an event currently underway. In some embodiments, tracking data me be representative of historical tracking data for an event that has completed. In some embodiments, tracking data may be extracted from video frames of a broadcast feed of the event. Generally, tracking data may refer to the positions of the players/ball on the playing surface. For example, tracking data may include (x, y) positions for each player and the ball at each frame, team and player identifiers (e.g., team IDs and player IDs) at each frame, time of each frame, current half of each frame, event identifier (e.g., event ID) of each frame, and the like.

At step 404, organization computing system 104 may convert the tracking data into a graph based representation of the tracking data. For example, pre-processing agent 116 may construct a graph G(V,E,U) that may be defined by nodes V, edges E, and global features U. In some embodiments, each node in a graph may represent the player and ball tracking data in a current frame. In some embodiments, each edge may include information about various relationships between nodes. In some embodiments, edges $e_{ij}$ may be directed edges and connect a sending node $v_i$ to a receiving node $v_j$.

In some embodiments, pre-processing agent 116 may store information on each node. For example, pre-processing agent 116 may store node features, which may include, but are not limited to, player (x, y) position, speed, acceleration, angle of motion, distances and angle to an attacking goal or basket, distance to the ball carrier, difference in the angle of motion to the ball carrier, and a flag that indicates whether the player is the ball carrier. In some embodiments, pre-processing agent 116 may store information on each edge. For example, pre-processing agent 116 may store edge features, which may include, but are not limited to, a flag defining the relationship between two nodes, distance between two players connected by the edge, difference in the angle of motion, and the like.

At step 406, organization computing system 104 may input the graph-based representation of the data into prediction engine 120. In some embodiments, prediction engine 120 may use pass model 126 to forecast or predict how likely a pass would be completed to every attacker off the ball at any moment within a player possession. To generate such prediction, pass model 126 may receive, as input, x-frames of tracking data (e.g., x=5). In other words, pass model 126 may receive, as input, x number of graph based representations of the tracking data, where each graph based representation corresponds to a respective frame of the tracking data.

In some embodiments, prediction engine 120 may use threat model 128 to forecast or predict the probability of a shot occurring in the next y-seconds (e.g., y=10) if a pass was played to any attacker.

In some embodiments, prediction engine 120 may use receiver model 130 to forecast or predict the likelihood of every player becoming the pass receiver at any moment within a player possession. To generate such prediction, receiver model 130 may receive, as input, z-frames of tracking data (e.g., x=10). In other words, receiver model 130 may receive, as input, z number of graph based representations of the tracking data, where each graph based representation corresponds to a respective frame of the tracking data.

At step 408, organization computing system 104 may generate predictions based on the input graph-based representations. For example, via pass model 126, prediction engine 120 may predict a likelihood of a pass being completed to every attacker off the ball at any moment within a player possession. For example, via threat model 128, prediction engine 120 may output a probability of a shot occurring in the next x-seconds (e.g., next 10 seconds) if a pass was played to any attacker. For example, via receiver model 130, prediction engine 120 may output a likelihood of every player becoming the pass receiver at any moment within a player possession.

At step 410, organization computing system 104 may generate a graphical representation of the outputs produced by prediction engine 120. For example, prediction engine 120 may be configured to generate a graphical representation that visually depicts a likelihood of a pass being completed to every attacker off the ball at any moment within a player possession, a probability of a shot occurring in the next x-seconds (e.g., next 10 seconds) if a pass was played to any attacker, and/or a likelihood of every player becoming the pass receiver at any moment within a player possession.

FIGS. 5A-5E illustrates an exemplary graphical representations 502, 504, 506, 508, and 510 (502-510) of the outputs produced by prediction engine 120, according to example embodiments. In some embodiments, graphical representations 502-510 may represent one or more frames from a game. In graphical representations 502-508, the defending team is able to force the attacking team into highly predictable and safe passes. However, at graphical representation 510, the attacking team is able to execute a very dangerous (but risky) pass, which eventually leads to a goal.

As shown in each graphical representation 502-510, each player involved in each frame is represented as a node 512 with players of each team corresponding to the same color. In some embodiments, each node may include an arrow stemming therefrom. The arrows may indicate a likelihood of each player becoming the pass receiver at any moment within a player possession, as generated by receiver model 130. In some embodiments, a node representing a player that currently has possession may include an arrow 514. Arrow 514 may be representative of a likelihood a shot occurring in the next x-seconds (e.g., next 10 seconds) if a pass was played to any attacker and a likelihood of a pass being completed to every attacker off the ball at any moment within a player possession. For example, the opacity of the arrow may indicate the probability of a shot occurring in the next x-seconds (e.g., next 10 seconds) if a pass was played to any attacker, while the color of the arrow may represent the likelihood of a pass being completed to every attacker off the ball at any moment within a player possession.

Figure 6A:
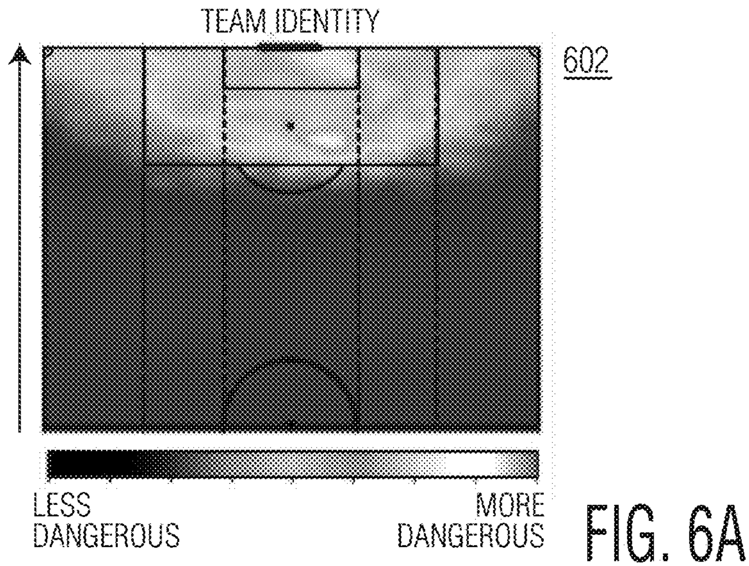
FIGS. 6A-6C illustrate one or more graphical representations that may be generated based on output from prediction engine, according to example embodiments.
Figure 6B:
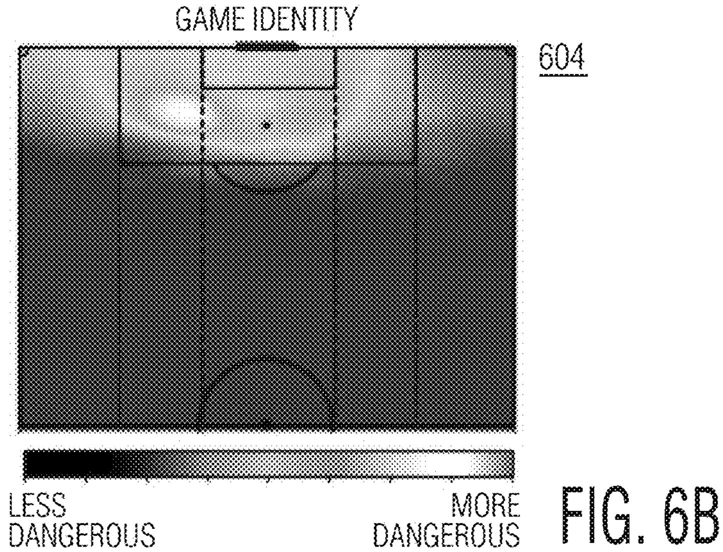
Figure 6C:
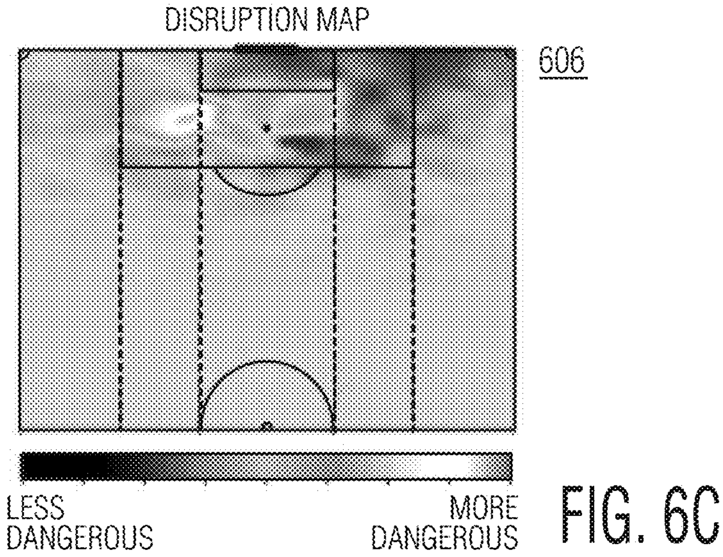

FIGS. 6A-6C illustrates one or more graphical representations that may be generated based on output from prediction engine 120, according to example embodiments.

As provided above, defensive toolkit 134 may be configured to generate one or more disruption maps based on outputs from one or more of pass model 126, threat model 128, and receiver model 130. A disruption map may be a weighted two-dimensional distribution that illustrates where a team, positively or negatively, disrupted the opposition's off ball options. In some embodiments, to generate a disruption map, defensive toolkit 134 may generate a team identity 602 for each team based on the outputs from pass model 126, threat model 128, and receiver model 130. Team identity 602 may act as a global representation of the team. Defensive toolkit 134 may further generate a same surface at a game level (e.g., game identity 604). To generate a disruption map 606, defensive toolkit 134 may subtract the two surfaces (e.g., team identity 602 and game identity 604). Disruption map 606 may reveal where the opposition disrupts (or not in some cases) the opposition's normal strategy and/or flow. In other words, disruption map 606 may create a compact representation of a team's effect on the opposition's threat, pass, and receiver values compared to their global average. An end user may use these maps to determine which teams had the biggest impact on their oppositions attacking style and efficiency.

In some embodiments, to create a team's identity maps, a team's season to data X, Y and probability value (e.g., output from pass model 126, threat model 128, and receiver model 130) may be used to create a weighted 2D probability distribution. To calculate the 2D weighted probability distribution, a 2D mesh grid may be fitted over the dimensions of the pitch (e.g., 100×100 grid over a 105×68 m pitch). The Euclidean distance of between each XY and grid node may be calculated. Nodes may then be iterated over with each sample being ordered in ascending order (smallest distance to largest distance from node). At each grid node, the resulting probability value may be calculated by an exponential smoothing based on the probability value of the sorted samples (closer values have more influence on the result). To generate the smooth surfaces, the mesh size and a smoothing factor alpha for the exponential smoothing may be tuned.

In some embodiments, to calculate the game identity map, the same process may be applied as used to calculate the team identity map. The key difference being only samples from the game may be used for the game identity map. The final disruption map may be calculated by subtracting the game identity map from the season identity map.

Figure 8:
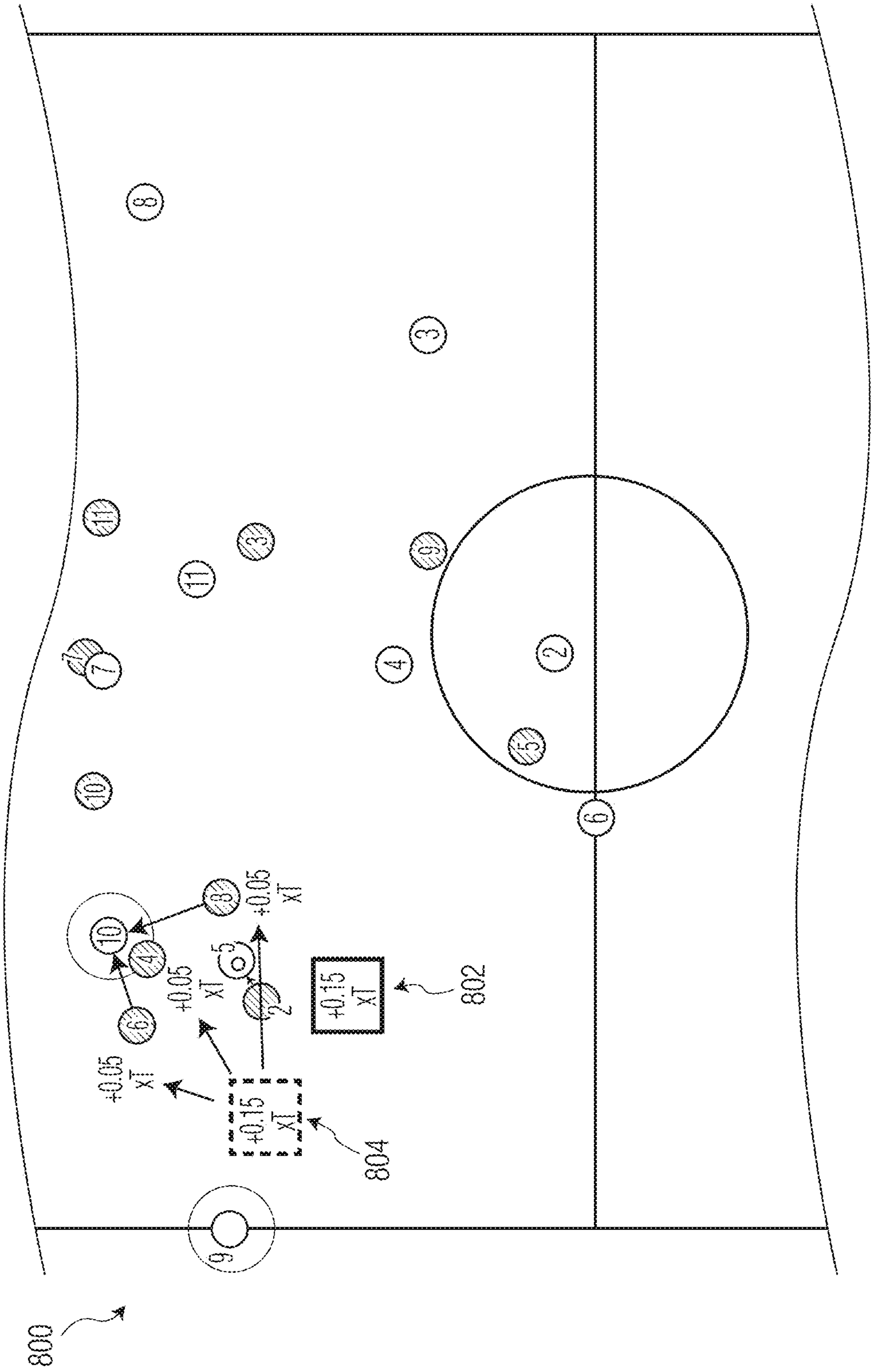
FIG. 8 illustrates one or more graphical representations that may be generated based on output from prediction engine, according to example embodiments.

FIG. 8 illustrates one or more graphical representations 800 that may be generated based on output from prediction engine 120, according to example embodiments. As shown, FIG. 8 illustrates an example of pressing the ball 802 and pressing the option 804.

Figure 9:
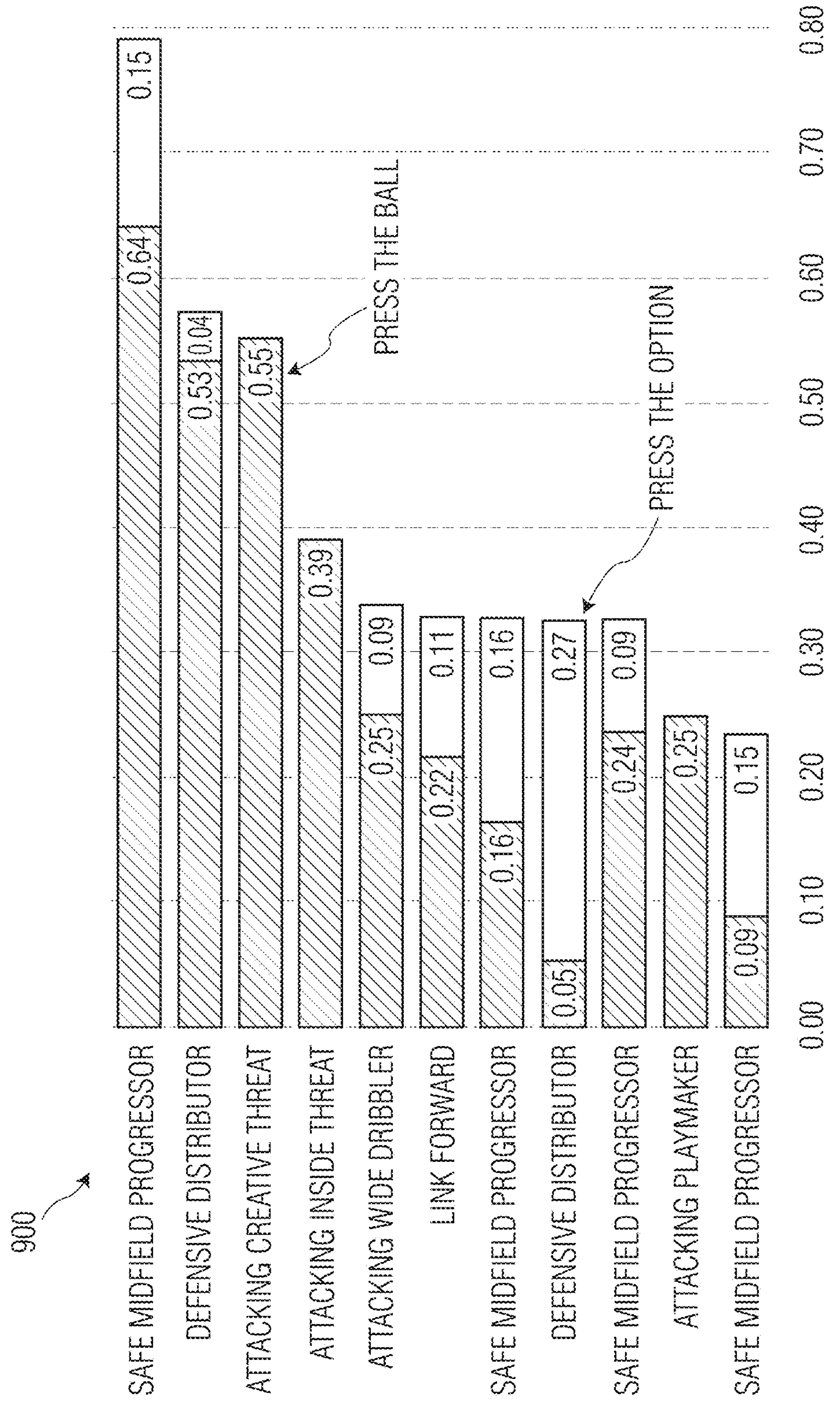
FIG. 9 illustrates one or more graphical representations that may be generated based on output from prediction engine, according to example embodiments.

FIG. 9 illustrates one or more graphical representations 900 that may be generated based on output from prediction engine 120, according to example embodiments. As shown FIG. 9 provides various defensive values that may be assigned to players. Defensive values may include, but are not limited to, safe midfield progressor, defensive distributor, attacking creative threat, attacking inside threat, attacking wide dribbler, link forward, safe midfield progressor, defensive distributor, safe midfield progressor, attacking playmaker, safe midfield progressor, and the like.

Figure 10A:
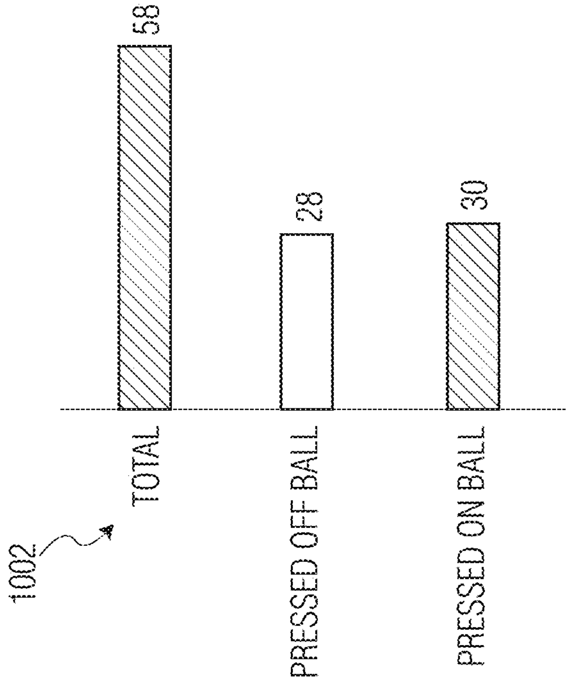
FIGS. 10A-10C illustrate one or more graphical representations that may be generated based on output from prediction engine, according to example embodiments.
Figure 10B:
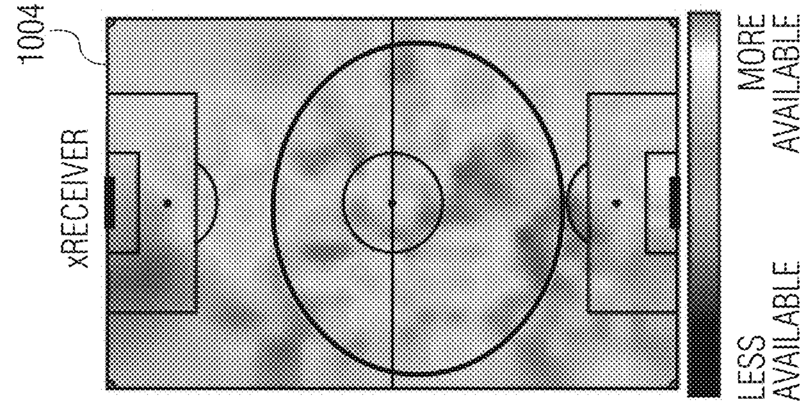
Figure 10C:
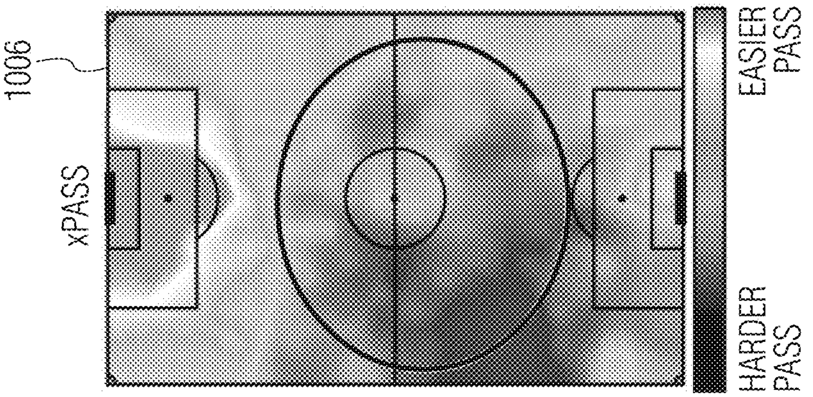

FIGS. 10A-10C illustrate one or more graphical representations that may be generated based on output from prediction engine 120, according to example embodiments. As shown, FIG. 10A provides various defensive metrics 1002 for a specific player—safe midfield progressor. The number of times pressed off ball and pressed off ball may be counted. The one or more graphical representations may further include heat map 1004 (FIG. 10B) and heat map 1006 (FIG. 10C) for outputs from both receiver model 130 and pass model 126.

Figure 11:
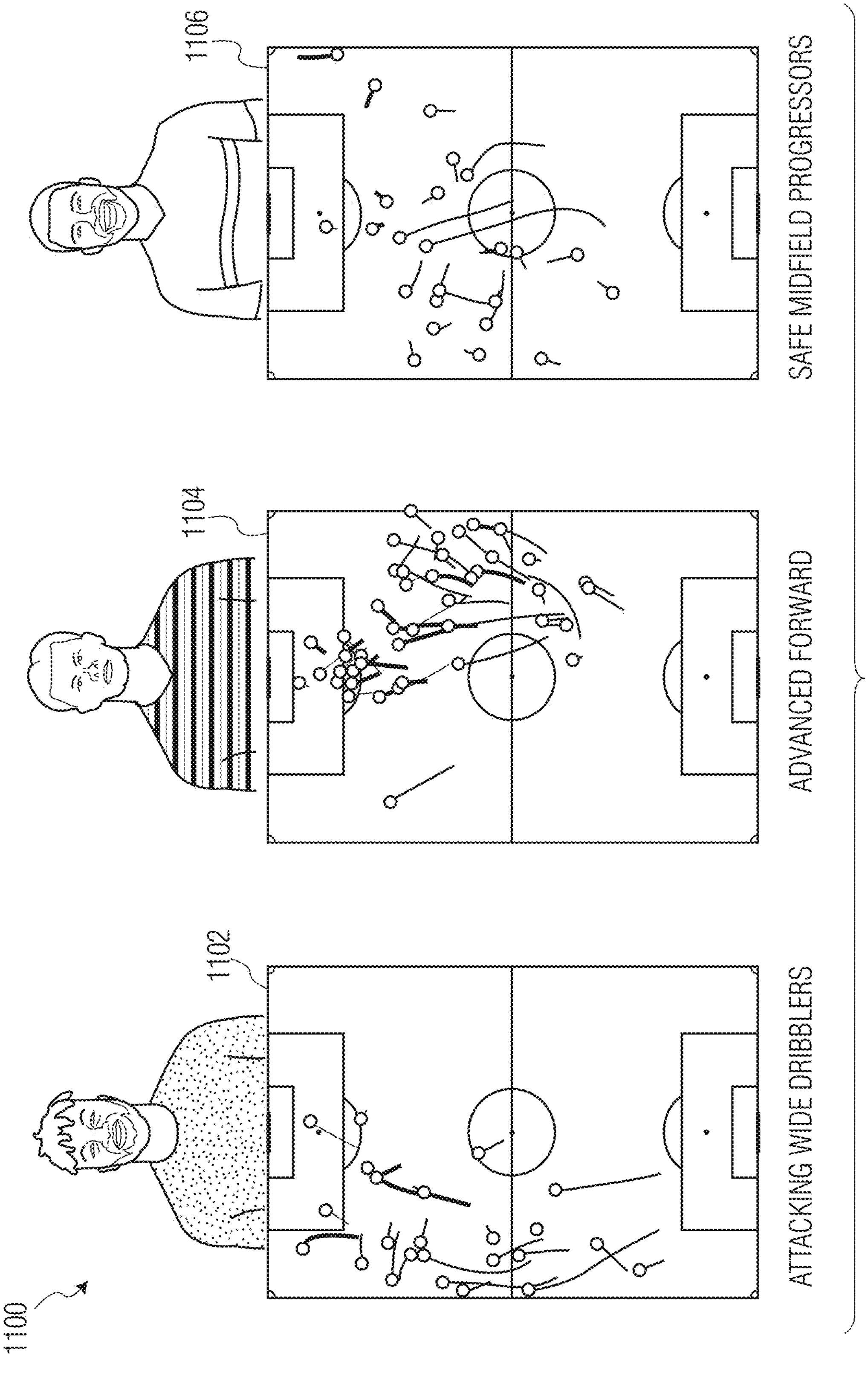
FIG. 11 illustrates one or more graphical representations that may be generated based on output from prediction engine, according to example embodiments.

FIG. 11 illustrates one or more graphical representations 1100 that may be generated based on output from prediction engine 120, according to example embodiments. As shown, FIG. 11 provides example active runs, on a role-by-role basis. For example, as shown, FIG. 11 provides active runs for attacking wide dribblers 1102, advanced forwards 1104, and safe midfield progressors 1106.

Figure 12:
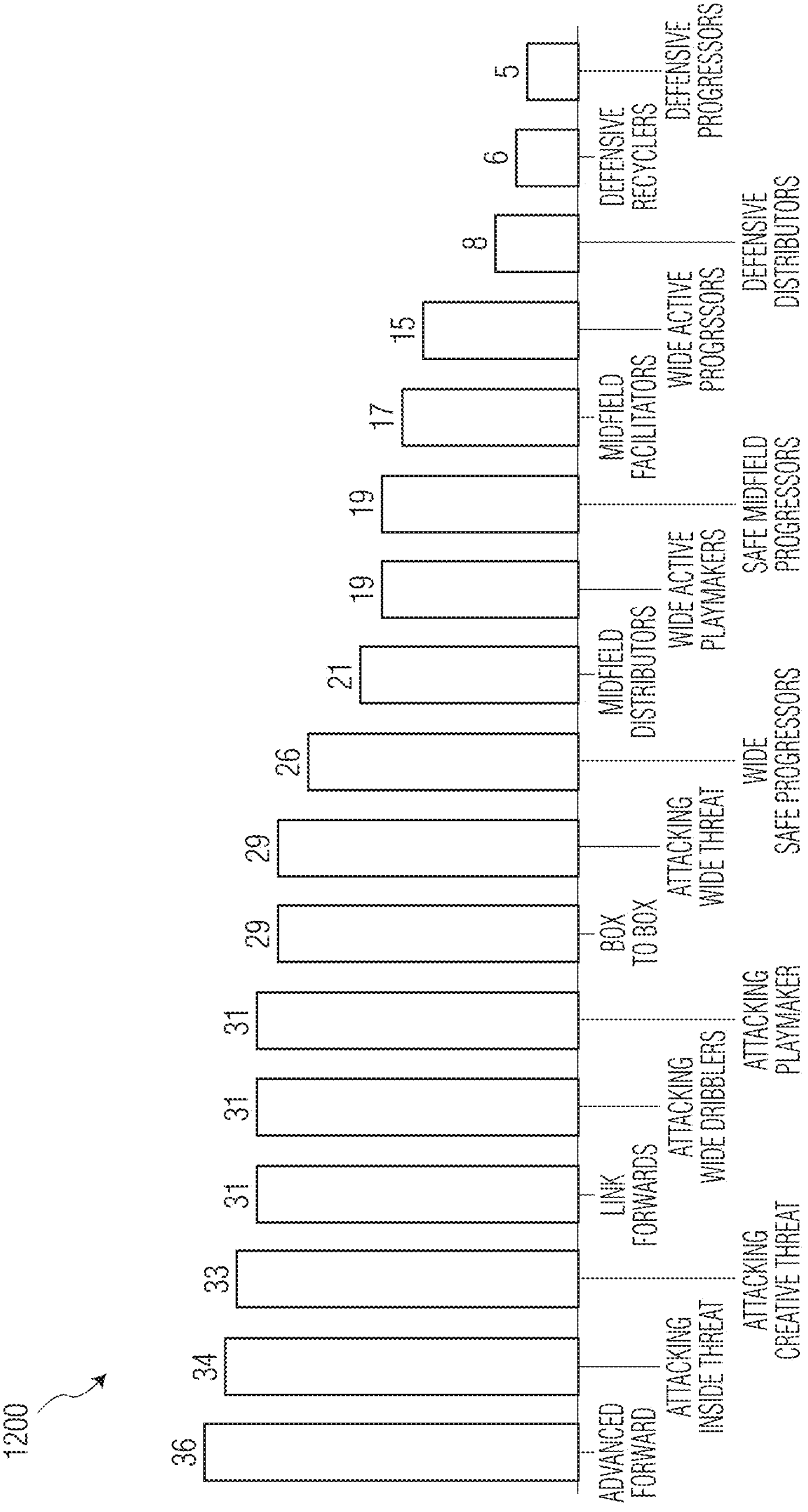
FIG. 12 illustrates one or more graphical representations that may be generated based on output from prediction engine, according to example embodiments.

FIG. 12 illustrates one or more graphical representations 1200 that may be generated based on output from prediction engine 120, according to example embodiments. As shown, FIG. 12 provides a running tally of active runs, per role, during a match.

Figure 13:
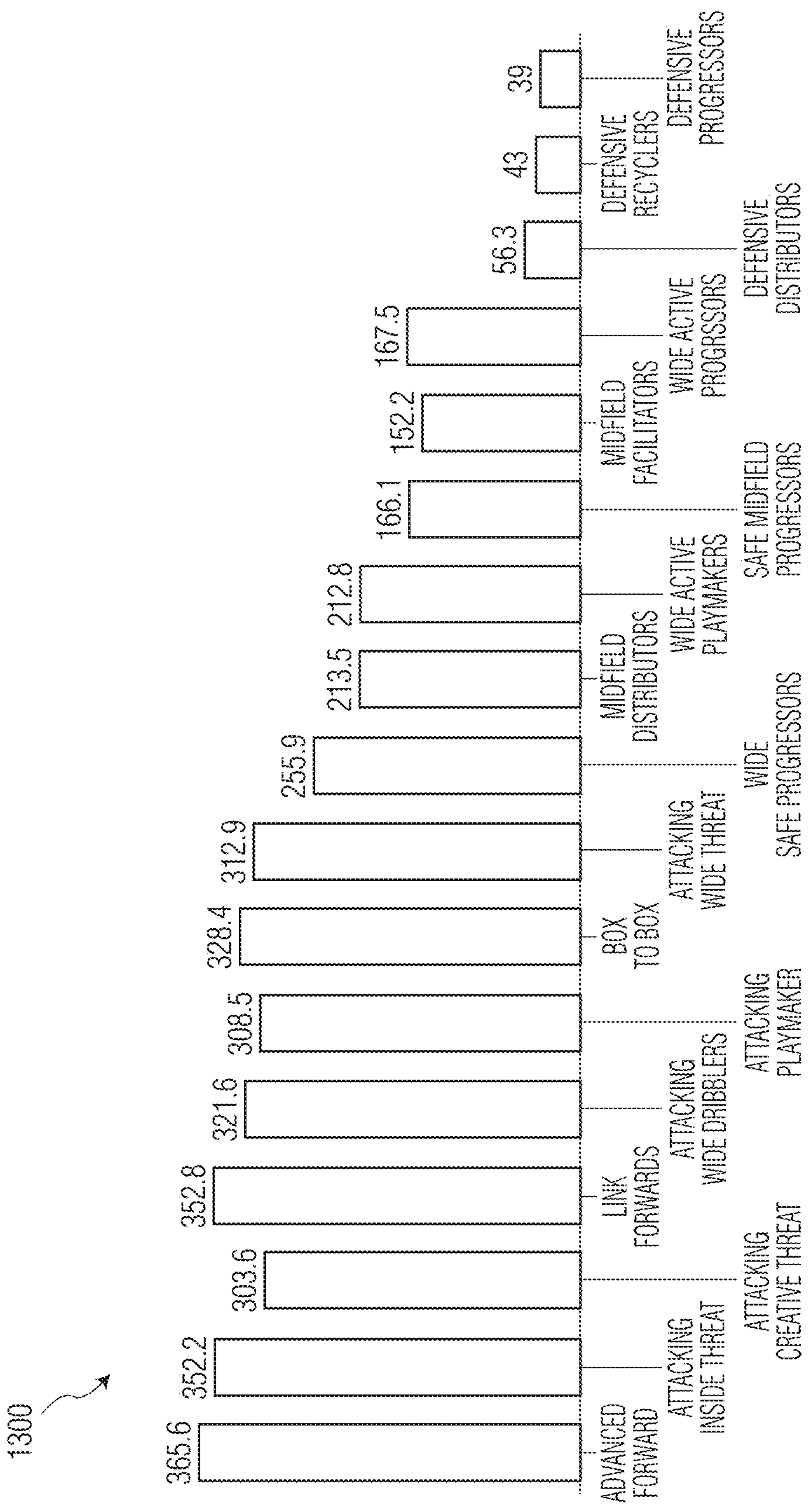
FIG. 13 illustrates one or more graphical representations that may be generated based on output from prediction engine, according to example embodiments.

FIG. 13 illustrates one or more graphical representations 1300 that may be generated based on output from prediction engine 120, according to example embodiments. As shown, FIG. 13 provides a running tally of active runs, covered by distance by role, during a match.

Figure 14A:
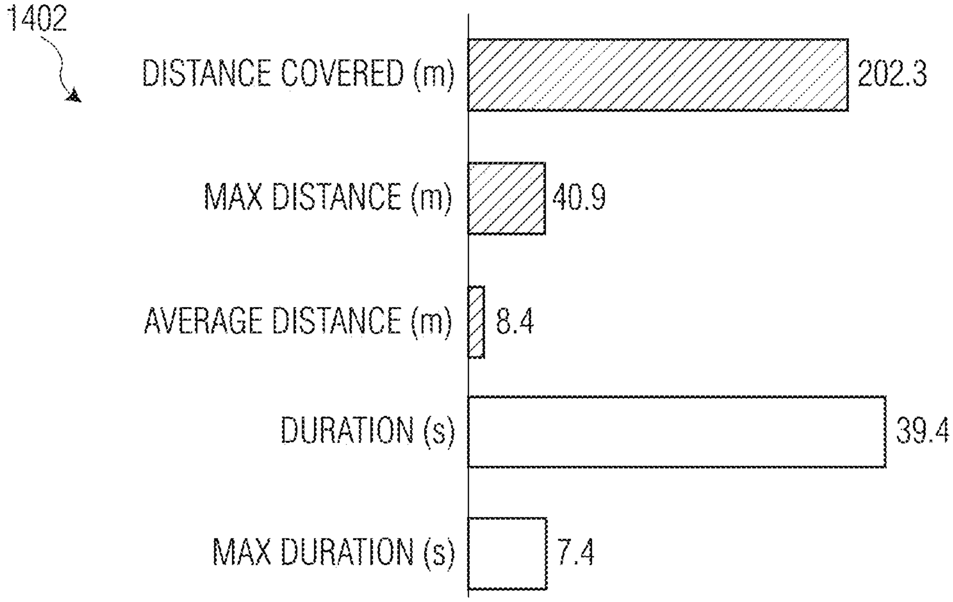
FIGS. 14A-14C illustrate one or more graphical representations that may be generated based on output from prediction engine, according to example embodiments.
Figure 14B:
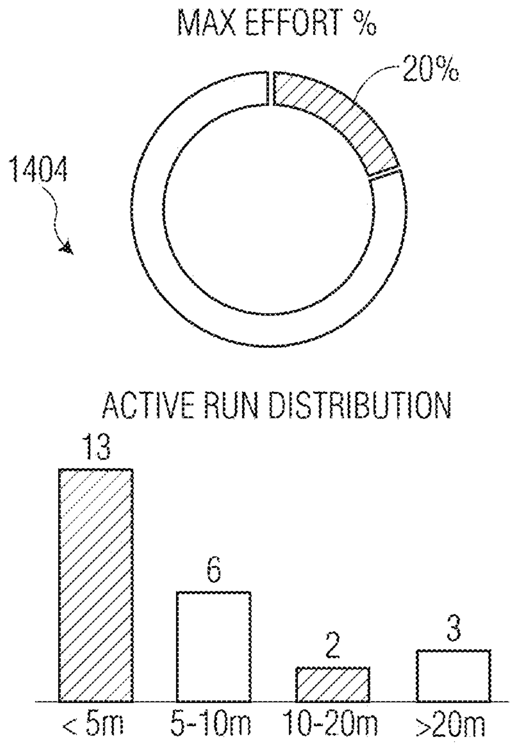
Figure 14C:
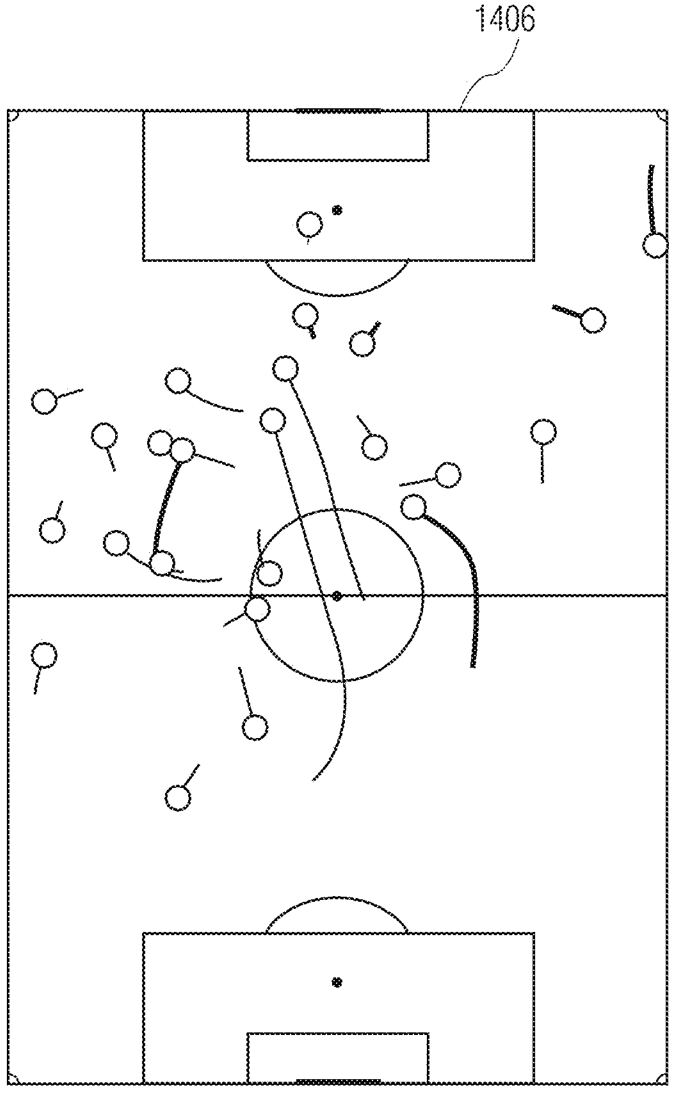

FIGS. 14A-14C illustrate one or more graphical representations that may be generated based on output from prediction engine 120, according to example embodiments. As shown in FIG. 14A, the one or more graphical representations may include a breakdown 1402 of a player based on the total distance covered, max distance, average distance per active run, the duration of the active run, the max duration, and the average duration. As shown in FIG. 14B, the one or more graphical representations may further include a breakdown 1404 based on the distance of each run. As shown in FIG. 14C, the one or more graphical representations may further include an illustration 1406 showing where each active run occurred and the length of the run.

Figure 7A:
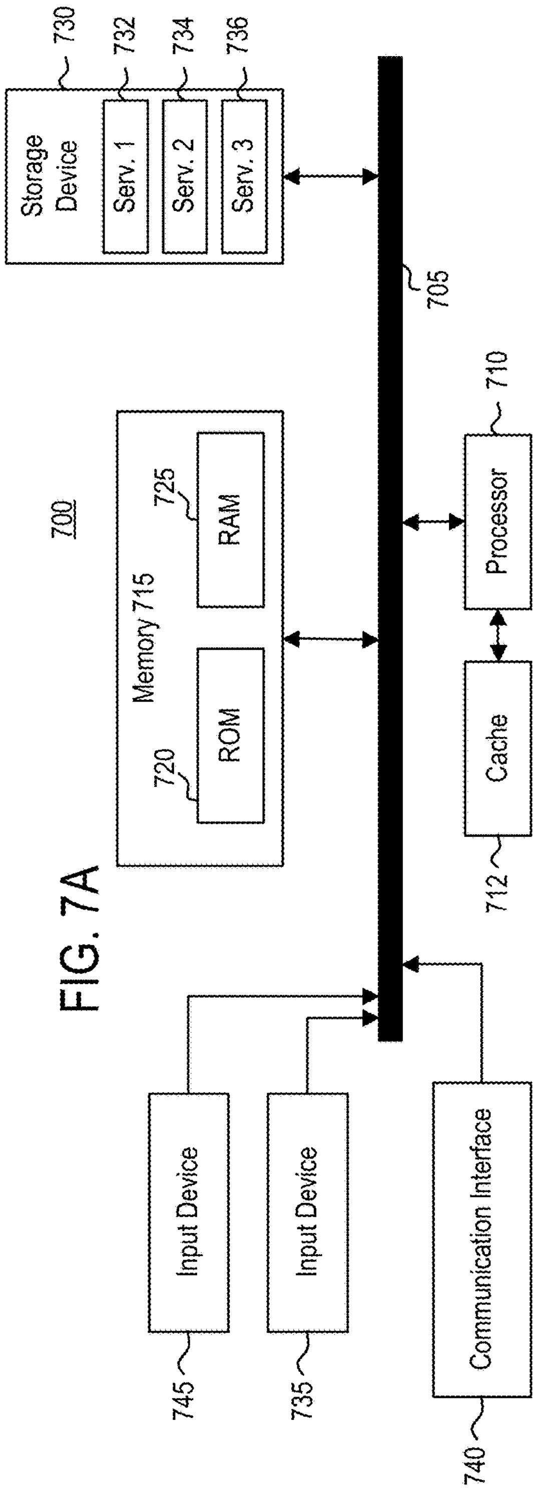
FIG. 7A is a block diagram illustrating a computing device, according to example embodiments.

FIG. 7A illustrates an exemplary system bus architecture of computing system 700, according to example embodiments. System 700 may be representative of at least a portion of organization computing system 104. One or more components of system 700 may be in electrical communication with each other using a bus 705. System 700 may include a processing unit (CPU or processor) 710 and a system bus 705 that couples various system components including the system memory 715, such as read only memory (ROM) 720 and random access memory (RAM) 725, to processor 710. System 700 may include a cache of high-speed memory connected directly with, in close proximity to, or integrated as part of processor 710. System 700 may copy data from memory 715 and/or storage device 730 to cache 712 for quick access by processor 710. In this way, cache 712 may provide a performance boost that avoids processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general purpose processor and a hardware module or software module, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with computing system 700, an input device 745 may represent any number of input mechanisms, such as a microphone for speech, a touch-sensitive screen for gesture or graphical input, keyboard, mouse, motion input, speech and so forth. An output device 735 (e.g., a display) may also be one or more of a number of output mechanisms known to those of skill in the art. In some instances, multimodal systems may enable a user to provide multiple types of input to communicate with computing system 700. Communications interface 740 may generally govern and manage the user input and system output. There is no restriction on operating on any particular hardware arrangement and therefore the basic features here may easily be substituted for improved hardware or firmware arrangements as they are developed.

Storage device 730 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include services 732, 734, and 736 for controlling the processor 710. Other hardware or software modules are contemplated. Storage device 730 may be connected to system bus 705. In one aspect, a hardware module that performs a particular function may include the software component stored in a computer-readable medium in connection with the necessary hardware components, such as processor 710, bus 705, output device 735, and so forth, to carry out the function.

Figure 7B:
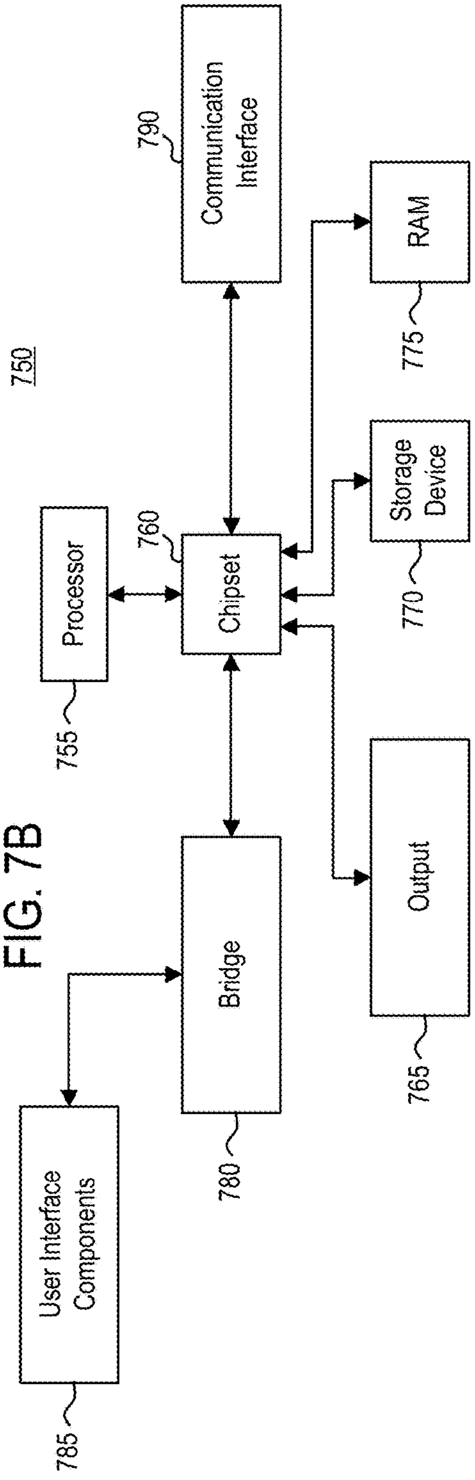
FIG. 7B is a block diagram illustrating a computing device, according to example embodiments.

FIG. 7B illustrates a computer system 750 having a chipset architecture that may represent at least a portion of organization computing system 104. Computer system 750 may be an example of computer hardware, software, and firmware that may be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 outputs information to output 765, such as a display, and may read and write information to storage device 770, which may include magnetic media, and solid-state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. In general, inputs to system 750 may come from any of a variety of sources, machine generated and/or human generated.

Chipset 760 may also interface with one or more communication interfaces 790 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 755 analyzing data stored in storage device 770 or RAM 775. Further, the machine may receive inputs from a user through user interface components 785 and execute appropriate functions, such as browsing functions by interpreting these inputs using processor 755.

It may be appreciated that example systems 700 and 750 may have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:

retrieving, by a computing system, training tracking data from a data store, the training tracking data comprising a plurality of training frames of data for a plurality of events across a plurality of seasons;

converting, by the computing system, the training tracking data into a plurality of training two-dimensional graph-based representations;

learning, by a prediction engine, to model defensive behavior based on the plurality of training two-dimensional graph-based representations by:

learning, by a first graph neural network, to predict a likelihood of a pass being completed at any moment within a possession, learning, by a second graph neural network, to predict a likelihood of a shot occurring within the possession, and learning, by a third graph neural network, to predict a likelihood of each player becoming a pass receiver within the possession;

receiving, by the computing system, tracking data for an event including a first team and a second team, the tracking data comprising a plurality of frames;

converting, by the computing system, the tracking data to a plurality of two-dimensional graph-based representations, wherein each two-dimensional graph-based representation corresponds to a frame of the plurality of frames;

modeling, by the computing system via the prediction engine, defensive behavior of the first team in the event based on the plurality of two-dimensional graph-based representations, the modeling further comprising:

outputting, via the first graph neural network, the second team's likelihood of completing a pass within the possession;

outputting, via the second graph neural network, the second team's likelihood of a shot occurring within the possession;

outputting, via the third graph neural network, the second team's likelihood of each player becoming a pass receiver within the possession; and generating, based on the outputs of the graph neural networks, a two-dimensional graph-based representation having a plurality of nodes corresponding to a plurality of players of the first team and a plurality of players of the second team, wherein a first node of the plurality of nodes represents a first player, a second node of the plurality of nodes represents a second player, and an indicator between the first node and second node indicates a likelihood of a shot occurring by the second player if a pass from the first player to the second player is successful.

2. The method of claim 1, further comprising:

detecting, by the computing system, active runs of offensive players based on the modeled defensive behavior of the first team in the event based on the plurality of graph-based representations.

3. The method of claim 2, further comprising:

breaking down, by the computing system, the active runs of the offensive players based on various metrics associated therewith.

4. The method of claim 1, further comprising:

assigning, by the computing system, a value to each player of the first team in the event based on the modeled defensive behavior.

5. The method of claim 1, wherein converting, by the computing system, the tracking data into the plurality of graph-based representations, comprises:

for each frame, generating a node representation of each player in the frame.

6. The method of claim 5, further comprising:

for each node, storing a plurality of node features therein, wherein the plurality of node features comprises at least one of player (x, y) position, speed of the player, acceleration of the player, a first angle of motion of the player, a first distance from the player to an attacking goal or a basket, a second angle between the player and the attacking goal or the basket, a second distance from the player to a ball carrier, a difference in the first angle of motion between the player and the ball carrier, and a flag that indicates whether the player is the ball carrier.

7. The method of claim 6, further comprising:

connecting each node in the frame using one or more edges.

8. The method of claim 7, further comprising:

for each edge, storing a plurality of edge features therein, wherein the plurality of edge features comprises at least one of a flag defining a relationship between a starting node and an ending node, a distance between two players connected by the edge, and a difference in the angle of motion between the two players connected by the edge.

9. A system, comprising:

a processor; and a memory having programming instructions stored thereon, which, when executed by the processor, causes the system to perform one or more operations, comprising:

retrieving, by a computing system, training tracking data from a data store, the training tracking data comprising a plurality of frames of data for a plurality of events across a plurality of seasons;

converting the training tracking data into a plurality of training two-dimensional graph-based representations;

learning, by a prediction engine, to model defensive behavior based on the plurality of training two-dimensional graph-based representations by:

learning, by a first graph neural network, to predict a first likelihood of a pass being completed at any moment within a possession, learning, by a second graph neural network, to predict a second likelihood of a shot occurring within the possession, and learning, by a third graph neural network, to predict a third likelihood of each player becoming a pass receiver within the possession;

receiving tracking data for an event including a first team and a second team, the tracking data comprising a plurality of frames;

converting the tracking data to a plurality of two-dimensional graph-based representations, wherein each two-dimensional graph-based representation corresponds to a frame of the plurality of frames;

modeling, via the prediction engine, defensive behavior of the first team in the event based on the plurality of two-dimensional graph-based representations, the modeling further comprising:

outputting, via the first graph neural network, the second team's likelihood of completing a pass within the possession;

outputting, via the second graph neural network, the second team's likelihood of a shot occurring within the possession;

outputting, via the third graph neural network, the second team's likelihood of each player becoming a pass receiver within the possession; and generating, based on the outputs of the graph neural networks, a two-dimensional graph-based representation having a plurality of nodes corresponding to a plurality of players of the first team and a plurality of players of the second team, wherein a first node of the plurality of nodes represents a first player, a second node of the plurality of nodes represents a second player, and an indicator between the first node and second node indicates a likelihood of a shot occurring by the second player if a pass from the first player to the second player is successful.

10. The system of claim 9, wherein learning, by the first graph neural network, to predict the first likelihood of the pass being completed at any moment within the possession, comprises:

identifying a subset of graph based representations that correspond to a subset of frames prior to the pass.

11. The system of claim 9, wherein learning, by the third graph neural network, to predict the third likelihood of each player becoming the pass receiver within the possession, comprises:

identifying a subset of graph based representations that correspond to a subset of frames prior to the pass.

12. The system of claim 9, wherein converting the tracking data into the plurality of graph-based representations, comprises:

for each frame, generating a node representation of each player in the frame.

13. The system of claim 12, further comprising:

for each node, storing a plurality of node features therein, wherein the plurality of node features comprises at least one of player (x, y) position, speed of the player, acceleration of the player, a first angle of motion of the player, a first distance from the player to an attacking goal or basket, a second angle between the player and the attacking goal or the basket, a second distance from the player to a ball carrier, a difference in the first angle of motion between the player and the ball carrier, and a flag that indicates whether the player is the ball carrier.

14. The system of claim 13, further comprising:

connecting each node in the frame using one or more edges.

15. A non-transitory computer readable medium comprising one or more sequences of instructions, which, when executed by one or more processors, causes a computing system to perform operations, comprising:

retrieving, by a computing system, training tracking data from a data store, the training tracking data comprising a plurality of training frames of data for a plurality of events across a plurality of seasons;

converting, by the computing system, the training tracking data into a plurality of training two-dimensional graph-based representations;

learning, by a prediction engine, to model defensive behavior based on the plurality of training two-dimensional graph-based representations by:

learning, by a first graph neural network, to predict a likelihood of a pass being completed at any moment within a possession, learning, by a second graph neural network, to predict a likelihood of a shot occurring within the possession, and learning, by a third graph neural network, to predict a likelihood of each player becoming a pass receiver within the possession;

receiving, by the computing system, tracking data for an event including a first team and a second team, the tracking data comprising a plurality of frames;

converting, by the computing system, the tracking data to a plurality of two-dimensional graph-based representations, wherein each two-dimensional graph-based representation corresponds to a frame of the plurality of frames;

modeling, by the computing system via the prediction engine, defensive behavior of the first team in the event based on the plurality of two-dimensional graph-based representations, the modeling further comprising:

outputting, via the first graph neural network, the second team's likelihood of completing a pass within the possession;

outputting, via the second graph neural network, the second team's likelihood of a shot occurring within the possession;

outputting, via the third graph neural network, the second team's likelihood of each player becoming a pass receiver within the possession; and generating, based on the outputs of the graph neural networks, a two-dimensional graph-based representation having a plurality of nodes corresponding to a plurality of players of the first team and a plurality of players of the second team, wherein a first node of the plurality of nodes represents a first player, a second node of the plurality of nodes represents a second player, and an indicator between the first node and second node indicates a likelihood of a shot occurring by the second player if a pass from the first player to the second player is successful.

16. The non-transitory computer readable medium of claim 15, wherein converting, by the computing system, the tracking data into the plurality of graph-based representations, comprises:

for each frame, generating a node representation of each player in the frame; and for each node, storing a plurality of node features therein, wherein the plurality of node features comprises at least one of player (x, y) position, speed of the player, acceleration of the player, a first angle of motion of the player, a first distance from the player to an attacking goal or a basket, a second angle between the player and the attacking goal or the basket, a second distance from the player to a ball carrier, a difference in the first angle of motion between the player and the ball carrier, and a flag that indicates whether the player is the ball carrier.

17. The non-transitory computer readable medium of claim 16, further comprising:

connecting each node in the frame using one or more edges; and for each edge, storing a plurality of edge features therein, wherein the plurality of edge features comprises at least one of a flag defining a relationship between a starting node and an ending node, a distance between two players connected by the edge, and a difference in the angle of motion between the two players connected by the edge.

18. The method of claim 1, wherein the training tracking data is extracted from a video feed.

19. The method of claim 1, the plurality of training graph-based representations being defined by at least nodes and edges.

20. The method of claim 1, further comprising generating a disruption map having a compact representation of the first team's effect on the second team's attacking strategy, the attacking strategy including the output of the first graph neural network, the output of the second graph neural network, and the output of the third graph neural network, wherein steps for generating the disruption map include:

generating a team identity map by creating a two-dimensional weighted probability distribution, wherein the two-dimensional probability distribution may be created by fitting a two-dimensional mesh grid over a dimension of a pitch;

generating a game identity map; and generating the disruption map by subtracting the game identity map from the team identity map.

* * * * *